United States Patent
Takei

(10) Patent No.: US 10,158,395 B2
(45) Date of Patent: Dec. 18, 2018

(54) WIRELESS SYSTEM, AND ELEVATOR CONTROL SYSTEM AND SUBSTATION MONITORING SYSTEM INCLUDING SAME

(71) Applicant: HITACHI, LTD., Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/817,322

(22) Filed: Nov. 20, 2017

(65) Prior Publication Data
US 2018/0152221 A1 May 31, 2018

(30) Foreign Application Priority Data

Nov. 28, 2016 (JP) ................................. 2016-229672

(51) Int. Cl.
*H04B 1/707* (2011.01)
*B66B 1/34* (2006.01)
*H04L 25/497* (2006.01)
*H02J 13/00* (2006.01)
*H02J 3/38* (2006.01)

(52) U.S. Cl.
CPC ........... *H04B 1/707* (2013.01); *B66B 1/3446* (2013.01); *H04L 25/497* (2013.01); *H02J 3/383* (2013.01); *H02J 13/00* (2013.01)

(58) Field of Classification Search
CPC ....... B66B 1/34; B66B 31/3446; H04B 1/707; H04B 7/10; H04J 1/00; H04J 11/0046; H04J 13/00; H04J 13/12; H04L 1/00; H04L 1/02; H04L 1/0033; H04L 25/02; H04L 25/497; H04L 27/00; H01Q 3/00; H01Q 25/00; H04W 8/00

USPC ................ 342/362, 365, 372; 370/329, 480; 375/141, 143, 260, 267, 295, 316, 340
See application file for complete search history.

(56) References Cited

U.S. PATENT DOCUMENTS

2004/0104843 A1* 6/2004 Mimura ............. G01R 29/0892
342/362
2004/0264592 A1* 12/2004 Sibecas .................. H01Q 21/24
375/267

(Continued)

FOREIGN PATENT DOCUMENTS

JP 2006-094215 A 4/2006

*Primary Examiner* — Shawkat M Ali
(74) *Attorney, Agent, or Firm* — Mattingly & Malur, PC

(57) ABSTRACT

A wireless system allows for selectively using, and communicating through, wireless propagation paths between radio devices in an over-the-horizen communication environment. Also an elevator control system and a substation monitoring system using the same are provided. The wireless system includes a transmitter having: two spatially orthogonal antennas; and a transmission circuit that transmits a signal having an information signal spread with one code and then superimposed on a circularly-polarized wave, along with a signal having the same information signal spread with two different codes and then superimposed on orthogonal statically-polarized waves, which are orthogonal to each other, and a receiver having: at least one antenna; and a reception circuit that takes a difference between the sum of two operation results obtained by despreading with two different codes a signal received through statically-polarized waves, and an operation result obtained by despreading with one code a signal received through a circularly-polarized wave.

20 Claims, 14 Drawing Sheets

(56) References Cited

U.S. PATENT DOCUMENTS

| | | | | |
|---|---|---|---|---|
| 2007/0222608 A1* | 9/2007 | Maniwa | ............... | G06K 7/0008 340/572.7 |
| 2011/0007758 A1* | 1/2011 | Macrae | .................... | H04B 7/10 370/480 |
| 2011/0019630 A1* | 1/2011 | Harris | ....................... | H03D 3/02 370/329 |
| 2013/0279631 A1* | 10/2013 | Bowers | .................. | H04L 27/04 375/300 |
| 2013/0336417 A1* | 12/2013 | Takei | ....................... | H04B 7/10 375/267 |
| 2018/0019835 A1* | 1/2018 | Kamiya | ............... | H04J 11/0046 |

* cited by examiner

WIRELESS SYSTEM, AND ELEVATOR CONTROL SYSTEM AND SUBSTATION MONITORING SYSTEM INCLUDING SAME

CROSS-REFERENCE TO RELATED APPLICATION

This application claims the benefit of priority to Japanese Patent Application No. 2016-229672 filed 28 Nov. 2016, the disclosures of all of which are hereby incorporated by reference in their entireties.

TECHNICAL FIELD

The present invention relates to a wireless system, and an elevator control system and a substation monitoring system using the same.

BACKGROUND ART

Many investments have been made to research and development of a technology called Internet of Things (IoT) for its practical use, in which various sensors are installed in equipment and information from these sensors is collected and analyzed to understand the operating status of the equipment for optimally managing a system that includes the equipment. In order to materialize communication with a large number of sensors installed in the equipment, the sensors include radio devices to form a wireless network with the radio devices. In such a wireless network, it is difficult to form a line-of-sight propagation path without any shielding object between a pair of radio devices communicating with each other, and thus the radio devices communicate in an over-the-horizon communication environment (i.e., over-the-horizon communication) using an electromagnetic wave reflected by the equipment which is generally an electromagnetic wave scatterer. The electromagnetic wave transmitted from a transmitter reaches a receiver via a plurality of different wireless propagation paths through single or multiple reflection(s).

Wireless communication using a conventional generic technique has a problem such that a plurality of wireless propagation paths formed between a transmitting point and a receiving point are concurrently used all at once, to cause the propagated information to have its quality degraded or to be altered to different information, if a failure occurs in a specific propagation path of the plurality of wireless propagation paths at a time of obtaining sensor information. In wireless communication, the wireless propagation paths as communication paths are open to the outside to cause a specific propagation path to be made to have a failure, and wireless communication using a conventional generic technique does not allow for identifying a specific wireless propagation path. This problem inhibits IoT technology from being adapted to infrastructure systems that provide lifelines and particularly require stability and safety of operation in a strict manner.

Japanese Patent Application Publication No. 2006-094215 provides a means for solving this problem. Japanese Patent Application Publication No. 2006-094215 discloses a technique of a wireless communication receiving device as described "[Problem] To increase receiving performance while reducing its throughput [Solution to the Problem] An estimation means 105 estimates the existence of a plurality of paths based on a received signal. A rake combining means 117 executes rake processing of transmission path estimation, phase amplitude correction, and despreading for each signal corresponding to each path, and combines a plurality of signals subjected to the rake processing. A frequency equalizing means 118 executes frequency equalization on a signal obtained by Fourier transforming the received signal, and despreads the processed signal. An operation selecting means 105 selects one of the rake combining means and the frequency equalizing means depending on the existence of the plurality of paths." (see ABSTRACT)

As cited above, the technique disclosed in Japanese Patent Application Publication No. 2006-094215 uses the correlation value of the CDMA spreading code to detect the phase difference of the electromagnetic waves for identifying the difference in the path lengths of the plurality of wireless propagation paths formed between the transmitting and receiving points.

SUMMARY OF THE INVENTION

Problems to be Solved

However, the technique disclosed in Japanese Patent Application Publication No. 2006-094215 has a problem of being unable to identify a wireless propagation path in a wireless system in which forming a line-of-sight propagation path is difficult and then over-the-horizen communication is established. That is, in a wireless system in which forming a line-of-sight propagation path is difficult and then over-the-horizen communication is established, an electromagnetic wave with a frequency of 1 GHz band or less is used in order to suppress the propagation loss in reflection to a low level. Under such conditions, the wavelength of electromagnetic waves is 30 cm or more. In contrast, the operation area of the infrastructure system that provides the lifeline is hundreds meters square or at most 1 km square, and the distance between pieces of equipment installed in the area is several meters or at most 10 meters. In such a propagation environment, the communication distance of a radio device installed in the equipment is at most several tens of meters, the difference between the path lengths of the plurality of propagation paths formed between the transmitting and receiving points is at most several meters, and the maximum frequency of the CDMA signal adapted to a radio device using electromagnetic waves of at most 1 GHz, for example in the technique of Japanese Patent Application Publication No. 2006-094215, is several tens MHz. Its wavelength is at least several tens of meters, and thus the technique of Japanese Patent Application Publication No. 2006-094215 is unable to identify a wireless propagation path.

The present invention has been devised in view of the above-described problems, and is intended to provide a wireless system capable of selectively using, and communicating through, wireless propagation paths formed between radio devices in an over-the-horizen communication environment, to contribute to maintaining and improving communication quality. The present invention is also intended to provide an elevator control system and a substation monitoring system to which this wireless system is applied.

Solution to Problems

In order to solve the above problem, one aspect of the present invention is as follows. That is, a wireless system of the present invention includes a transmitter having: two antennas that are spatially orthogonal to each other; and a transmission circuit that transmits a signal having an information signal spread with one code and then superimposed on a circularly polarized wave, in which a polarized wave rotates with time, along with a signal having the same information signal as the information signal spread with two different codes and then superimposed on statically polarized waves which are orthogonal to each other, and a receiver having: at least one antenna; and a reception circuit that takes a difference between the sum of two operation results obtained by dispreading with two different codes a received signal transmitted through statically polarized waves, and an operation result obtained by despreading with one code a received signal transmitted through a circularly polarized wave, wherein the transmitter and the receiver communicate with each other to transmit and receive the information signal. Other aspects of the present invention will be described in DETAILED DESCRIPTION.

Advantageous Effects of the Invention

The present invention provides a wireless system capable of selectively using, and communicating through, a plurality of wireless propagation paths formed between radio devices in an over-the-horizen communication environment, to contribute to maintaining and improving communication quality. In addition, the present invention provides an elevator control system and a substation monitoring system to which this wireless system is applied.

BRIEF DESCRIPTION OF DRAWINGS

FIG. 2A shows an example of a code CC2, FIG. 2B shows an example of a code CC1, and a cosine wave, a sine wave and a period of a circularly polarized wave, and FIG. 2C shows an example of the relationship between a circularly polarized wave and a received signal in an output of a reception combiner;

FIG. 8A shows a code from a second transmission code generator in the transmitter, FIG. 8B shows a code from a first transmission code generator in the transmitter, FIG. 8C shows the structure of a time-delay circuit array (TDA) in the receiver and a code, FIG. 8D shows the code from the first transmission code generator in the receiver, FIG. 8E shows the structure of a time-delay circuit array (TDA) in the receiver and the code, and FIG. 8F shows the code from the second transmission code generator in the receiver;

DETAILED DESCRIPTION

Hereinafter, embodiments of the present invention will be described with reference to the drawings as appropriate.

First Embodiment

Figure 1:
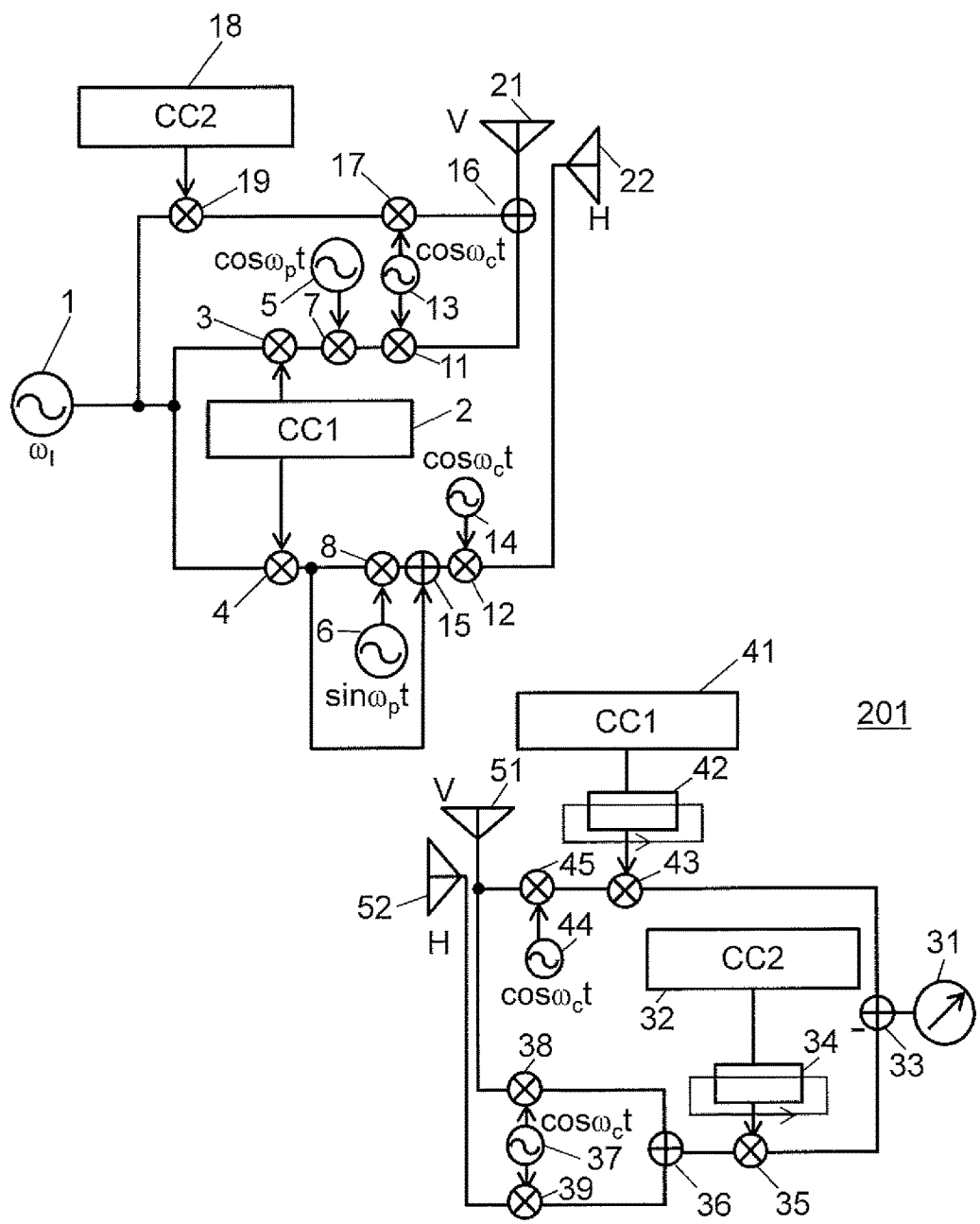
FIG. 1 is a diagram showing an exemplary configuration of a wireless system according to a first embodiment of the present invention.

In a first embodiment of the present invention, an exemplary configuration of a wireless system will be described with reference to FIG. 1, in which a plurality of frequencies are used in an over-the-horizen communication environment to control polarized waves for conducting communication. FIG. 1 is a diagram showing an exemplary configuration of a wireless system according to the first embodiment of the present invention. In FIG. 1, a transmitter 101 and a receiver 201 as radio devices constitute a wireless system.

<Configuration of Transmitter 101>

The transmitter 101 includes: a transmission circuit having an information signal ($\omega_I$) generator 1, a first transmission code (CC1) generator 2, a second transmission code (CC2) generator 18, transmission multipliers 3, 4, 7, 8, 11, 12, 17, 19, transmission combiners 15, 16, a circularly-polarized-wave frequency-based cosine generator 5, a circularly-polarized-wave frequency-based sine generator 6, and transmission carrier wave generators 13, 14, a transmission antenna (V) 21, and a transmission antenna (H) 22.

<<Outline of Functions of Components>>

The information ($\omega_I$) signal generator 1 generates an information signal to be transmitted from the transmitter 101 of the wireless system. The transmission multipliers 3, 4, 7, 8, 11, 12, 17, 19 are used for superimposing (modulating or spreading) two signals. The transmission combiners 15, 16 are used to combine two signals.

The first transmission code (CC1) generator 2 and the second transmission code (CC2) generator 18 generate special pulse trains intended to be used for a self-correlation function, a cross-correlation function, or the like. In addition, the first transmission code (CC1) generator 2 and the second transmission code (CC2) generator 18 generate codes which are in a mutually orthogonal relationship. Note that CC of CC1 and CC2 is an abbreviation for Correlation Code. Further, the code (CC1) from the first transmission code (CC1) generator 2 is a code assigned to the own device (transmitter 101), while the code (CC2) from the second transmission code (CC2) generator 18 is a code assigned to another device (receiver 201), and the codes are mainly used for identifying a signal of the own device (transmitter 101) and a signal of another device (receiver 201). Furthermore, the transmitter 101 and the receiver 201, which wirelessly communicate with each other, mutually recognize the codes CC1 and CC2 in advance.

The circularly-polarized-wave frequency-based cosine generator 5 generates a signal of cos $\omega_p t$, while the circularly-polarized-wave frequency-based sine generator 6 generates a signal of sine $\omega_p t$. These signals are combined to generate a circularly polarized wave, as will be described later. The transmission carrier wave generators 13, 14 generate a carrier wave (cos $\omega_c t$) for propagating the information signal ($\omega_I$) as an electromagnetic wave. The transmission antenna (V) 21 (first transmission antenna) and the transmission antenna (H) 22 (second transmission antenna) are both polarized-wave antennas that emit polarized waves. The transmission antenna (V) 21 and the transmission antenna (H) 22 are spatially arranged so as to be orthogonal to each other. That is, the transmission antenna (V) 21 is arranged to vertically emit the outputted polarized waves, while the transmission antenna (H) 22 is arranged to horizontally emit the outputted polarized waves. Note that although the terms "vertically" and "horizontally" are used here, there is no absolute reference direction for the vertical and horizontal directions, and what it means is that, as described above, the transmission antenna (V) 21 and transmission antenna (H) 22 are arranged so as to be spatially orthogonal to each other.

<<Connection Between Components>>

In the transmitter 101, the output signal of the information signal ($\omega_I$) generator 1 flows through two paths. The output signal in one of the two paths is inputted to a first input of the transmission multiplier 19. A second input of the transmission multiplier 19 is inputted with the transmission code (CC2) from the second transmission code (CC2) generator 18, and the information signal ($\omega_I$) is superimposed with the transmission code (CC2) so as to be spread. The output signal of the transmission multiplier 19 is inputted to a first input of the transmission multiplier 17. A second input of the transmission multiplier 17 is inputted with a carrier wave (cos $\omega_c t$) from the transmission carrier wave generator 13, and the output signal of the transmission multiplier 19 is superimposed (modulated) with the carrier wave (cos $\omega_c t$).

In addition, the output signal of the information signal generator 1 in the other of the two paths flows through further two paths so as to be inputted to respective first inputs of the transmission multiplier 3 and the transmission multiplier 4.

A second input of the transmission multiplier 3 is inputted with the transmission code from the first transmission code (CC1) generator 2, and the information signal ($\omega_I$) is superimposed with (multiplied by) the transmission code (CC1) so as to be spread. This output signal of the transmission multiplier 3 is inputted to a first input of the transmission multiplier 7. A second input of the transmission multiplier 7 is inputted with a cosine wave (cos $\omega_p t$) from the circularly-polarized-wave frequency-based cosine generator 5, and the output signal of the transmission multiplier 3 is superimposed (modulated) with the cosine wave (cos $\omega_p t$). This output signal of the transmission multiplier 7 is inputted to a first input of the transmission multiplier 11. A second input of the transmission multiplier 11 is inputted with the carrier wave (cos $\omega_c t$) from the transmission carrier wave generator 13, and the output signal of the transmission multiplier 7 is superimposed (modulated) with the carrier wave (cos $\omega_c t$).

Further, a second input of the transmission multiplier 4 is inputted with the transmission code from the first transmission code (CC1) generator 2, and the information signal ($\omega_I$) is superimposed with (multiplied by) the transmission code (CC1) so as to be spread. This output signal of the transmission multiplier 4 is inputted to a first input of the transmission multiplier 8 and a second input of the transmission combiner 15. A second input of the transmission multiplier 8 is inputted with a sine wave (sin $\omega_p t$) from the circularly-polarized-wave frequency-based sine generator 6, and the output signal of the transmission multiplier 4 is superimposed (modulated) with the sine wave (sin $\omega_p t$). This output signal of the transmission multiplier 8 is inputted to a first input of the transmission combiner 15. The transmission combiner 15 combines the output signal of the transmission multiplier 8 and the output signal of the transmission multiplier 4, and inputs the output signal to a first input of the transmission multiplier 12. A second input of the transmission multiplier 12 is inputted with the carrier wave (cos $\omega_c t$) from the transmission carrier wave generator 14, and the output signal of the transmission combiner 15 is superimposed (modulated) with the carrier wave (cos $\omega_c t$).

An output signal of the transmission multiplier 17 is inputted to a first input of the transmission combiner 16. An output signal of the transmission multiplier 11 is inputted to a second input of the transmission combiner 16. The transmission combiner 16 combines (adds) the output signal of the transmission multiplier 17 and the output signal of the transmission multiplier 11, and inputs the combined output signal to the transmission antenna (V) 21. The transmission antenna (V) 21 converts the inputted electric signal into an electromagnetic wave and emits the wave into the air.

An output signal of the transmission multiplier 12 is inputted to the transmission antenna (H) 22. The transmission antenna (H) 22 converts the inputted electric signal into an electromagnetic wave and emits it into the air.

In the transmitter 101 configured as described above, a signal having the information signal ($\omega_I$) superimposed with the transmission code (CC2) and the carrier wave (cos $\omega_c t$), on a first path through the information signal ($\omega_I$) generator 1→the transmission multiplier 19→the transmission multiplier 17→the transmission combiner 16→the transmission antenna (V) 21, is outputted as a first statically polarized wave from the transmission antenna (V) 21. In addition, a signal having the information signal ($\omega_I$) superimposed with the transmission code (CC1) and the carrier wave (cos $\omega_c t$), on a second path through the information signal ($\omega_I$) generator 1→the transmission multiplier 4→the transmission combiner 15→the transmission multiplier 12→the transmit antenna (H) 22, is outputted as a second statically polarized wave from the transmission antenna (H) 22.

Further, in the transmitter 101 configured as described above, a signal having the information signal ($\omega_I$) superimposed with the transmission code (CC1), the cosine wave (cos $\omega_p t$), and the carrier wave (cos $\omega_c t$), on a third path through the information signal ($\omega_I$) generator 1→the transmission multiplier 3→the transmission multiplier 7→the transmission multiplier 11→the transmission combiner 16→the transmission antenna (V) 21, is outputted from the transmission antenna (V) 21. Furthermore, a signal having the information signal ($\omega_I$) superimposed with the transmission code (CC1), the sine wave (sin $\omega_p t$), and the carrier wave (cos $\omega_c t$), on a fourth path through the information signal ($\omega_I$) generator 1→the transmission multiplier 4→the transmission multiplier 8→the transmission combiner 15→the transmission multiplier 12→the transmission antenna (H) 22, is outputted from the transmission antenna (H) 22. Note that the information signal ($\omega_I$) is superimposed with the cosine wave (cos $\omega_p t$) on the third path and the information signal ($\omega_I$) is superimposed with the sine wave (sin $\omega_p$t) on the fourth path, and then the respectively generated signals are outputted from the transmission antenna (V) 21 and the transmission antenna (H) 22, which are spatially orthogonal to each other, to collectively form a circularly polarized wave.

Note that the frequency (angular frequency) $\omega_p$ hereinabove is preferably smaller than one-tenth of the propagation frequency (angular frequency) $\omega_e$ of a carrier wave.

<<Principle of Circularly Polarized Wave>>

The principle of this circularly polarized wave will be briefly described. For example, the following Equation 1 is well known, as Euler's formula in the complex plane.

$$\exp(i\theta) = \cos\theta + i*\sin\theta \quad \text{(Equation 1)}$$

where, i is an imaginary unit, and $\theta$ is a rotation angle. In Equation 1, when $\theta$ takes respective values, the vector in Equation 1 draws a circle and moves (rotates) in a circumferencial direction. Cos $\theta$ is a real number, and i*sin $\theta$ is an imaginary number. That is, in the complex plane of the real number axis and the imaginary number (i) axis, cos $\theta$ and i*sin $\theta$ as vectors move, or rotate, in the circumferencial direction. Generally speaking, a circularly polarized wave rotates the polarization at the same frequency as that of propagation. However, the circularly polarized wave in this article rotates the polarization at an arbitrary frequency different from that of propagation.

The fact that the real number axis and the imaginary number (i) axis are orthogonal to each other corresponds to the fact that the transmission antenna (V) 21 and transmission antenna (H) 22 as the transmission antennas according to the first embodiment of the present invention are installed so as to be spatially orthogonal to each other. In addition, "cos $\theta$" on the right side of Equation 1 corresponds to the fact that polarized waves of cosine wave (cos $\omega_p$t) are emitted in the first embodiment from the transmission antenna (V) 21 as electromagnetic waves. Further, "i*sin $\theta$" on the right side of Equation 1 corresponds to the fact that polarized waves of sine wave (sin $\omega_p$t) are emitted in the first embodiment from the transmission antenna (H) 22 as electromagnetic waves. That is, the transmission antenna (V) 21 and transmission antenna (H) 22 are arranged so as to be spatially orthogonal to each other, and a radio wave converted from an electric signal of the cosine wave (cos $\omega_p$t) is outputted from the transmission antenna (V) 21 while a radio wave converted from an electric signal of the sine wave (sin $\omega_p$t) is outputted from the transmission antenna (H) 22 to cause a combined radio wave to be an electromagnetic wave (radio wave) of the circularly polarized wave in which a polarized wave circularly rotates in the air.

<Configuration of Receiver 201>

Next, the configuration of the receiver 201 will be described. The receiver 201 includes a reception antenna (V) 51, a reception antenna (H) 52, reception multipliers 35, 38, 39, 43, 45, reception carrier wave generators 37, 44, a reception combiner 36, a first reception code (CC1) generator 41, a second reception code (CC2) generator 32, reception sliding correlators 34, 42, a reception subtractor 33, and a signal detection circuit 31. Note that in the above configuration, components excluding the reception antenna (V) 51 and reception antenna (H) 52 are sometimes referred to as a reception circuit of the receiver 201.

<<Outline of Functions of Components>>

The reception antenna 51 (first reception antenna) and the reception antenna 52 (second reception antenna) are arranged so as to be spatially orthogonal to each other. That is, the reception antenna (V) 51 is arranged so that vertically polarized waves come incident, while the reception antenna (H) 52 is arranged so that the horizontally polarized waves come incident. Note that although the terms "vertically" and "horizontally" are used here, there is no absolute reference direction for the vertical and horizontal directions, and what it means is that, as described above, the reception antenna 51 (V) and reception antenna (H) 52 are arranged so as to be spatially orthogonal to each other. In addition, the vertical direction of the transmission antenna (V) 21 is not necessarily the same as that of the reception antenna (V) 51. Further, the horizontal direction of the transmission antenna (H) 22 is not necessarily the same as that of the reception antenna (H) 52.

The reception multipliers 35, 38, 39, 43, 45 are used for superimposing (down-converting or despreading) two signals. The reception carrier wave generators 37, 44 generate the same carrier wave (cos $\omega_c$t) as the transmission carrier wave generators 13, 14. The reception combiner 36 is used to combine two signals. The first reception code (CC1) generator 41 generates the same code as the first transmission code (CC1) generator 2. The second receive code (CC2) generator 32 generates the same code as the second transmit code (CC2) generator 18. The reception sliding correlators 34, 42 have functions of shifting (sliding) the codes of the reception code (CC2) generator 32 and reception code (CC1) generator 41, respectively. The reception subtractor 33 has a function of taking the difference between two signals. The signal detection circuit 31 detects information of a received signal.

<<Connection Between Components>>

Electromagnetic waves which have come incident from the reception antenna (V) 51 and reception antenna (H) 52 are converted into electric signals, respectively. The received signal from the reception antenna (V) 51 flows through two paths. The received signal in one of the two paths is inputted to a first input of the reception multiplier 45. A second input of the reception multiplier 45 is inputted with a carrier wave (cos $\omega_c$t) from the reception carrier wave generator 44, and a signal is outputted which has the carrier wave (cos $\omega_c$t) removed from the received signal, i.e., down-converted, in the reception multiplier 45. The received signal from the reception antenna (V) 51 in the other of the two paths is inputted to a first input of the reception multiplier 38. A second input of the reception multiplier 38 is inputted with the carrier wave (cos $\omega_c$t) from the reception carrier wave generator 37, and a signal is outputted which has the carrier wave (cos $\omega_c$t) removed from the received signal, i.e., down-converted, in the reception multiplier 38.

The received signal from the reception antenna (H) 52 is inputted to a first input of the reception multiplier 39. A second input of the reception multiplier 39 is inputted with the carrier wave (cos $\omega_c$t) from the reception carrier wave generator 37, and a signal is outputted which has the carrier wave (cos $\omega_c$t) removed from the received signal, i.e., down-converted, in the reception multiplier 39.

An output signal of the reception multiplier 38 is inputted to a first input of the reception combiner 36. An output signal of the reception multiplier 39 is inputted to a second input of the reception combiner 36. The reception combiner 36 combines (adds) the output signal of the reception multiplier 38 and the output signal of the reception multiplier 39 so to output the result.

The code as an output of the first reception code (CC1) generator 41 is inputted to the reception sliding correlator 42. An output signal of the reception sliding correlator 42 is inputted to a second input of the reception multiplier 43. A first input of the reception multiplier 43 is inputted with an output signal from the reception multiplier 45. The reception multiplier 43 is used for multiplication using an output of the first reception code (CC1) generator 41 which causes a correlation calculation by the reception sliding correlator 42 to result in the maximum correlation. Note that the correlation calculation is a calculation of determining how much the transmission code (CC1) on the transmission side in the received signal inputted from the reception antenna 51 and the reception code (CC1) from the first reception code (CC1) generator 41 are correlated (coincide) with each other.

The transmission signal (CC1) is included in the received signal, but detecting the transmission code (CC1) is not easy due to an elapse of time for propagation or reflection such as by shielding objects during propagation. That is why the reception sliding correlator 42 is used to slide the code (CC1) from the first reception code (CC1) generator 41 for calculating and detecting correlation (coincidence) on a trial basis. Additionally, this is also a step of despreading the received signal with the code (CC1) by the first reception code (CC1) generator 41, the reception sliding correlator 42, and the reception multiplier 43.

The code as an output of the second reception code (CC2) generator 32 is inputted to the reception sliding correlator 34. An output signal of the reception sliding correlator 34 is inputted to a second input of the reception multiplier 35. A first input of the reception multiplier 35 is inputted with an output signal from the reception combiner 36. The reception multiplier 35 is used for multiplication using an output from the second reception code (CC2) generator 32 which causes a correlation calculation by the reception sliding correlator 34 to result in the maximum correlation. Note that the correlation calculation is a calculation of determining how much the transmission code (CC2) on the transmission side in the received signal inputted from the reception antenna 52 and the reception code (CC2) from the second reception code (CC2) generator 32 are correlated (coincide) with each other.

The transmission signal (CC2) is included in the received signal, but detecting the transmission code (CC2) is not easy due to an elapse of time for propagation or reflection such as by shielding objects during propagation. That is why the reception sliding correlator 34 is used to slide the code from the second reception code (CC2) generator 32 for calculating and detecting correlation (coincidence) on a trial basis. Additionally, this is also a step of despreading the received signal with the code (CC2) by the second reception code (CC2) generator 32, the reception sliding correlator 34, and the reception multiplier 35.

An output of the reception multiplier 43 is inputted to a first input of the reception subtractor 33. An output of the reception multiplier 35 is inputted to a second input of the reception subtractor 33. An output of the reception subtractor 33 is the difference between the signal inputted to the first input and the signal inputted to the second input, as an output signal. The output signal of the reception subtractor 33 is inputted to the signal detection circuit 31. This signal is detected in the signal detection circuit 31.

<Signal Waveform and Code>

Figure 2A:
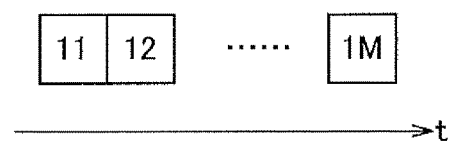
FIGS. 2A to 2C are diagrams illustrating the outline of the relationship between signal waveforms and codes in respective parts of the wireless system according to the first embodiment of the present invention, where
Figure 2B:
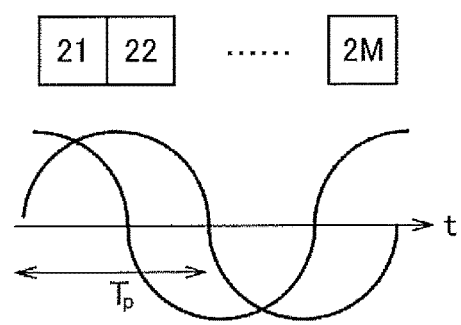
Figure 2C:
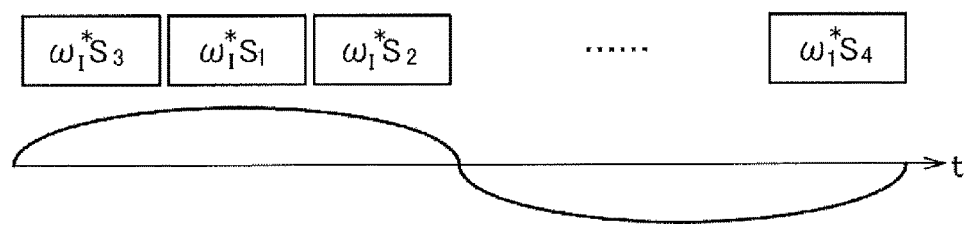

Next, a description will supplementally be given of a relationship between signal waveforms and codes at respective parts of the transmitter 101 and receiver 201 in FIG. 1. FIGS. 2A to 2C are diagrams illustrating the outline of the relationship between signal waveforms and codes in respective parts of the wireless system according to the first embodiment of the present invention, where FIG. 2A shows an example of a code CC2, FIG. 2B shows an example of a code CC1, and a cosine wave, a sine wave and a period $T_p$ of a circularly polarized wave, and FIG. 2C shows an example of the relationship between a circularly polarized wave and a received signal in an output of the reception combiner 36 (FIG. 1).

In FIG. 2A, "11, 12, - - - , 1M" indicates an exemplary array of the code (CC2) in the second transmission code (CC2) generator 18 and the second reception code (CC2) generator 32. Note that "t" indicates time (transition of time).

In FIG. 2B, "21, 22, - - - , 2M" indicates an exemplary array of the code (CC1) in the first transmission code (CC1) generator 2 and the first reception code (CC1) generator 41. Note that "t" indicates time (transition of time). In addition, as the signal according to the code (CC1) from the first transmission code (CC1) generator 2 is related to a circularly polarized wave, the general relationship between the cosine wave, the sine wave, and the period $T_p$ in the circularly polarized wave ($\omega_p$) is illustrated. However, it is a conceptual diagram showing the general relationship, and the period $T_p$ and the code size are not intended to show an actual case.

In FIG. 2C, "$\omega_I * S_3$, $\omega_I * S_1$, $\omega_I * S_2$, - - - , $\omega_I * S_4$" shows an example of the relationship between the circularly polarized wave and the received signal in the output of the reception combiner 36. Note that "$\omega_I * S_3$" or "$\omega_I * S_1$" for example represents the output of the reception combiner 36 as a result of arithmetic processing of the information signal ($\omega_I$) or as a result of being influenced during propagation. Additionally, FIG. 2C shows the general relationship between the circularly polarized wave indicated by a sine wave or a cosine wave and "$\omega_I * S_3$, $\omega_I * S_1$, $\omega_I * S_2$, - - - , $\omega_I * S_4$." Note that "t" indicates time (transition of time).

<Operating Principle of Wireless System of First Embodiment>

A description will be given in detail of the operating principle of the wireless system by the transmitter 101 and receiver 201 of the first embodiment.

<<First and Second Statically Polarized Waves>>

The output signal of the information signal ($\omega_I$) generator 1 is superimposed with the code from the first transmission code (CC1) generator 2 and then transmitted from the second transmission antenna (H) 22 via the first statically polarized wave. Along with this, the output signal of the information signal ($\omega_I$) generator 1 is superimposed with the code from the second transmission code generator 18 and then transmitted from the first transmission antenna (V) 21 via the second statically polarized wave orthogonal to the first statically polarized wave. This allows for receiving at a receiving point a combined wave of two statically polarized waves, orthogonal to each other, having different codes superimposed, regardless of the reflection experienced on the propagation path from the transmitter 101 to the receiver 201. If the different codes contained in the received signal have a low overall correlation value, this means that the signals have come from different polarized waves through different paths. That is, if the different codes have a low overall correlation value, the receiver 201 can separately demodulate signals from separate polarized waves which are orthogonal to each other. That is, the received signal is always acquired. The received signal is thus meant to be transmitted from the transmitter to the receiver by a combined wave of radio waves arriving at the receiver 201 via different propagation paths.

<<Circularly Polarized Wave>>

An electromagnetic wave superimposed with the output from the first transmission code (CC1) generator 2 is transmitted by two transmission antennas 21, 22, spatially orthogonal to each other, as a radio wave in which a circularly polarized wave rotates with time at the circularly polarized wave frequency ($\omega_p$) that is generally different from the carrier wave frequency ($\omega_c$), so as to arrive at the receiver. Accordingly, when a radio wave polarized in a specific orientation with time is received with one reception antenna, the signal, which has been transmitted from the transmitter 101 through a circularly polarized wave at the time when the polarized orientation is orthogonal to said one reception antenna, will not come out in the output of said one reception antenna.

The signal transmitted through a circularly polarized wave generally has the polarized wave rotated at the receiving point, even after passing through propagation paths formed by a plurality of reflected waves between transmitting and receiving points. Different propagation paths generally have different shifts of the polarized wave angle due to reflection, and therefore at a given time only the signal that has passed through a predetermined propagation path will not come out in the output of said one reception antenna.

<<Difference Between Signal in Statically Polarized Wave and Signal in Circularly Polarized Wave>>

In the wireless system according to the first embodiment of the present invention, the difference is taken between a signal in a circularly polarized wave which allows for capturing a received signal by one antenna, and a signal in a combined wave of two separate statically-polarized waves, orthogonal to each other, captured by two antennas, spatially orthogonal to each other. For this operation, the circularly polarized wave allows for excluding only the signal that has passed through a predetermined propagation path and has a predetermined polarized-wave angle when it has arrived at the receiving point at a predetermined time. In addition, the combined wave of two statically polarized waves, orthogonal to each other, at all times gives signals that have passed through all propagation paths. Accordingly, taking the difference (reception subtractor 33) between the signal in the circularly polarized wave and the signal in the combined wave of the two statically polarized waves, orthogonal to each other, allows for individually receiving at a predetermined time only the signal that has passed through a predetermined propagation path.

Note that the above processing will be described more in detail by including other views such as a propagation path. A signal transmitted using different codes (CC1, CC2) through statically polarized waves, spatially orthogonal to each other, experiences one or more reflections between the transmitting and receiving points, and then is received as a signal spread with different codes in the statically polarized waves, spatially orthogonal to each other. Thus, the signal is received by the two reception antennas 51, 52, spatially orthogonal to each other, and therefore the signal transmitted through statically polarized waves is temporally always captured. In contrast, the signal transmitted through a circularly polarized wave is received as the circularly polarized wave to cause a signal received by one antenna to produce a zero signal when the polarization orientation of the circularly polarized wave is in line with the direction orthogonal to the orientation of this antenna, as long as such a condition continues, due to a spatial filtering property of the antenna. Different propagation paths formed between the transmitting and receiving points causes different reflections to generally have different shifts of the polarized wave angle. Then, taking the difference between demodulated operation results of the received signals transmitted through the circularly polarized wave and the statically polarized waves results in discrimination of the signals received through different propagation paths having different shifts of the polarized wave angle, to have such signals temporally at different timings. Using these discriminated received signals at different timings allows for selecting and using a signal from the signals transmitted through a plurality of wireless propagation paths formed between the transmitting and receiving points.

Advantageous Effects of First Embodiment

As described above, the wireless system of the first embodiment allows for selectively using a plurality of wireless propagation paths formed between the transmitting and receiving points temporally at different times within one period of the circularly polarized wave to conduct communication. In other words, a signal having a frequency sufficiently lower than the frequency of the circularly polarized wave is wirelessly transmitted using a predetermined propagation path, to allow for selecting a wireless propagation path to avoid the influence from obstacles and interferers locally present between the transmitting and receiving points. That is, the wireless system has advantageous effects of achieving wireless communication with high reliability, sureness, and safety.

Second Embodiment

Figure 3:
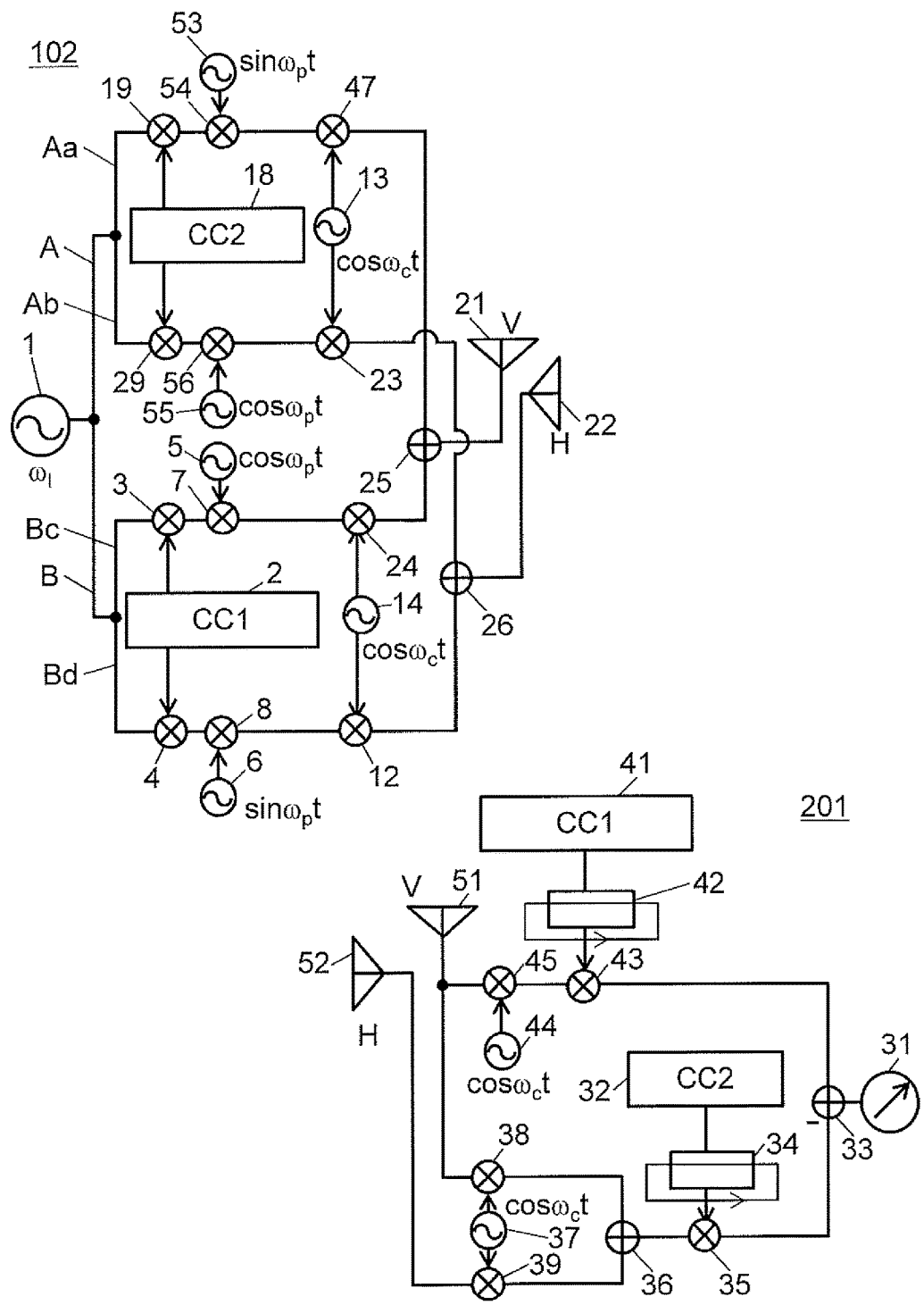
FIG. 3 is a diagram showing an exemplary configuration of a wireless system according to a second embodiment of the present invention.

In a second embodiment of the present invention, a description will be given of an exemplary configuration of a wireless system that uses a plurality of frequencies in an over-the-horizen communication environment to control polarized waves for conducting communication, with reference to FIG. 3. FIG. 3 is a diagram showing an exemplary configuration of a wireless system according to the second embodiment of the present invention. In FIG. 3, a transmitter 102 and a receiver 201 as radio devices constitute a wireless system. The configuration of the receiver 201 in FIG. 3 is the same as that of the receiver 201 in FIG. 1, and therefore the same reference numerals are assigned and any duplicate description will be omitted.

<Configuration of Transmitter 102>

The transmitter 102 in FIG. 3 includes the information signal ($\omega$I) generator 1, the first transmission code (CC1) generator 2, the second transmission code (CC2) generator 18, transmission multipliers 3, 4, 7, 8, 12, 19, 23, 24, 29, 47, 54, 56, transmission combiners 25, 26, circularly-polarized-wave frequency-based cosine generators 5, 55, circularly-polarized-wave frequency-based sine generators 6, 53, transmission carrier wave generators 13, 14, the transmission antenna (V) 21, and the transmission antenna (H) 22.

Basic functions of the information signal ($\omega$I) generator 1, the transmission multipliers 3, 4, 7, 8, 12, 19, 23, 24, 29, 47, 54, 56, the transmission combiners 25, 26, the first transmission code (CC1) generator 2, the second transmission code (CC2) generator 18, the circularly-polarized-wave frequency-based cosine generator 5, 55, the circularly-polarized-wave frequency-based sine generators 6, 53, the transmission carrier wave generators 13, 14, the transmission antenna (V) 21, and the transmission antenna (H) 22 are the same as those in the first embodiment, and therefore descriptions thereof will be omitted.

<<Connection Between Components>>

The output signal of the information signal ($\omega$I) generator 1 flows through two paths (first level). The output signal in one of the two paths (on a side A) flows through further two paths (second level). The output signals in one of the second-level two paths (on a side Aa) is inputted to the first input of the transmission multiplier 19. The output signal in the other of the second-level two paths (on a side Ab) is inputted to a first input of the transmission multiplier 29. Also, the output signal in the other of the first-level two paths (on a side B) flows through further two paths (second level). The output signal in one of the second-level two paths (on a side Bc) is inputted to the first input of the transmission multiplier 3. The output signal in the other of the second-level two paths (on a side Bd) is inputted to the first input of the transmission multiplier 4.

The second input of the transmission multiplier 19 is inputted with the transmission code (CC2) from the second transmission code (CC2) generator 18, and the information signal ($\omega_I$) is superimposed with the transmission code (CC2) so as to be spread. The output signal of the transmission multiplier 19 is inputted to a first input of the transmission multiplier 54. A second input of the transmission multiplier 54 is inputted with a sine wave (sin $\omega_p$t) from the circularly-polarized-wave frequency-based sine generator 53, and the output signal of the transmission multiplier 19 is superimposed (modulated) with the sine wave (sin $\omega_c$t). The output signal of the transmission multiplier 54 is inputted to a first input of the transmission multiplier 47. A second input of the transmission multiplier 47 is inputted with the carrier wave (cos $\omega_c$t) from the transmission carrier wave generator 13, and an output signal of the transmission multiplier 54 is superimposed (modulated) with the carrier wave (cos $\omega_c$t).

A second input of the transmission multiplier 29 is inputted with the transmission code from the second transmission code (CC2) generator 18, and the information signal ($\omega_I$) is superimposed with the transmission code (CC2) so as to be spread. An output signal of the transmission multiplier 29 is inputted to a first input of the transmission multiplier 56. A second input of the transmission multiplier 56 is inputted with the cosine wave (cos $\omega_p$t) from the circularly-polarized-wave frequency-based cosine generator 55, and an output signal of the transmission multiplier 29 is superimposed (modulated) with the cosine wave (cos $\omega_p$t). An output signal of the transmission multiplier 56 is inputted to a first input of the transmission multiplier 23. A second input of the transmission multiplier 23 is inputted with the carrier wave (cos $\omega_c$t) from the transmission carrier wave generator 13, and the output signal of the transmission multiplier 56 is superimposed (modulated) with the carrier wave (cos $\omega_c$t).

The second input of the transmission multiplier 3 is inputted with the transmission code (CC1) from the first transmission code (CC1) generator 2, and the information signal ($\omega_I$) is superimposed with the transmission code (CC1) so as to be spread. The output signal of the transmission multiplier 3 is inputted to the first input of the transmission multiplier 7. The second input of the transmission multiplier 7 is inputted with the cosine wave (cos $\omega$pt) from the circularly-polarized-wave frequency-based cosine generator 5, and the output signal of the transmission multiplier 3 is superimposed (modulated) with the cosine wave (cos $\omega_p$t). The output signal of the transmission multiplier 7 is inputted to a first input of the transmission multiplier 24. A second input of the transmission multiplier 24 is inputted with the carrier wave (cos $\omega_c$t) from the transmission carrier wave generator 14, and the output signal of the transmission multiplier 7 is superimposed (modulated) with the carrier wave (cos $\omega_c$t).

The second input of the transmission multiplier 4 is inputted with the transmission code (CC1) from the first transmission code (CC1) generator 2, and the information signal ($\omega_I$) is superimposed with the transmission code (CC1) so as to be spread. The output signal of the transmission multiplier 4 is inputted to the first input of the transmission multiplier 8. The second input of the transmission multiplier 8 is inputted with the sine wave (sin $\omega_p$t) from the circularly-polarized-wave frequency-based sine generator 6, and the output signal of the transmission multiplier 4 is superimposed (modulated) with the sine wave (sin $\omega_p$t). The output signal of the transmission multiplier 8 is inputted to the first input of the transmission multiplier 12. The second input of the transmission multiplier 12 is inputted with the carrier wave (cos $\omega_c$t) from the transmission carrier wave generator 14, and the output signal of the transmission multiplier 8 is superimposed (modulated) with the carrier wave (cos $\omega_c$t).

An output signal of the transmission multiplier 47 is inputted to a first input of the transmission combiner 25. The output signal of the transmission multiplier 24 is inputted to a second input of the transmission combiner 25. The transmission combiner 25 combines the output signal of the transmission multiplier 47 and the output signal of the transmission multiplier 24, and then the combined output signal is inputted to the transmission antenna (V) 21. The transmission antenna (V) 21 converts the inputted electric signal into an electromagnetic wave and emits the wave into the air.

An output signal of the transmission multiplier 23 is inputted to a first input of the transmission combiner 26. The output signal of the transmission multiplier 12 is inputted to a second input of the transmission combiner 26. The transmission combiner 26 combines the output signal of the transmission multiplier 23 and the output signal of the transmission multiplier 12, and then the combined output signal is inputted to the transmission antenna (H) 22. The transmission antenna (H) 22 converts the inputted electric signal into an electromagnetic wave and emits the wave into the air.

Note that as previously described, the transmission antenna (V) 21 and transmission antenna (H) 22 are spatially orthogonal to each other. Additionally, as described above, the receiver 201 in FIG. 3 has the same configuration as the receiver 201 in FIG. 1.

In the present (second) embodiment, there are two (two series of) signals having the information signal ($\omega_I$) superimposed with the code as an output of the first transmission code (CC1) generator 2. One series of signal is superimposed (modulated) with the cosine wave (cos $\omega_p$t) and its electromagnetic wave is emitted into the air from the first transmission antenna (V) 21, while the other series of signal is superimposed (modulated) with the sine wave (sin $\omega_p$t) and its electromagnetic wave is emitted from the second transmission antenna (H) 22 into the air. That is, a circularly polarized wave (electromagnetic wave) superimposed with the code as an output of the first transmission code (CC1) generator 2 is emitted into the air. In addition, there are two (two series of) signals having the information signal ($\omega_I$) superimposed with the code as an output of the second transmission code (CC2) generator 18. One series of signal is superimposed (modulated) with the sine wave (sin $\omega_p$t) and its electromagnetic wave is emitted from the first transmission antenna (V) 21 into the air, while the other series of signal is superimposed (modulated) with the cosine wave (cos $\omega_p$t) and its electromagnetic wave is emitted from the second transmission antenna (H) 22 into the air. That is, a circularly polarized wave (electromagnetic wave) superimposed with the code as an output of the second transmission code (CC2) generator 18 is emitted into the air.

In the present (second) embodiment, the signal transmitted through the circularly polarized wave superimposed with the code as an output of the first transmission code (CC1) generator 2 is the same as that in the first embodiment. As described above, in the present (second) embodiment, there is also a signal transmitted through the circularly polarized wave superposed with the code as an output of the second transmission code (CC2) generator 18. That is, in the present (second) embodiment, the circularly polarized wave superimposed with the output from the first transmission code (CC1) generator 2 and the circularly polarized wave, which is orthogonal to the above-identified circularly polarized wave, concurrently superimposed with the output from the second transmission code (CC2) generator 18 (i.e., the circularly polarized wave propagating with a phase shift of 90 degrees or a time shift from the above-identified circularly polarized wave) are obtained at the receiving point. Accordingly, even if one of the two reception antennas (51, 52) fails to receive one of the circularly polarized waves, the other circularly polarized wave will be received.

As in the first embodiment described with reference to FIG. 1, the series of signals inputted from the two reception antennas (51, 52) are assigned with either one of the codes (CC1, CC2) outputted from the two code generation circuits 32, 41, respectively, so that the received signals are demodulated and then combined. This method allows for continuously capturing the received signal at any time over one period of the circularly polarized wave. That is, the received signal is meant to be transmitted from the transmitter 102 to the receiver 201 by way of a combined wave of radio waves arriving at the receiver 201 through different propagation paths.

Advantageous Effects of Second Embodiment

The second embodiment has advantageous effects of achieving wireless communication having high reliability, sureness, and safety that allows for selecting a wireless propagation path to avoid the influence from obstacles and interferers locally present between the transmitting and receiving points.

Third Embodiment

Figure 4:
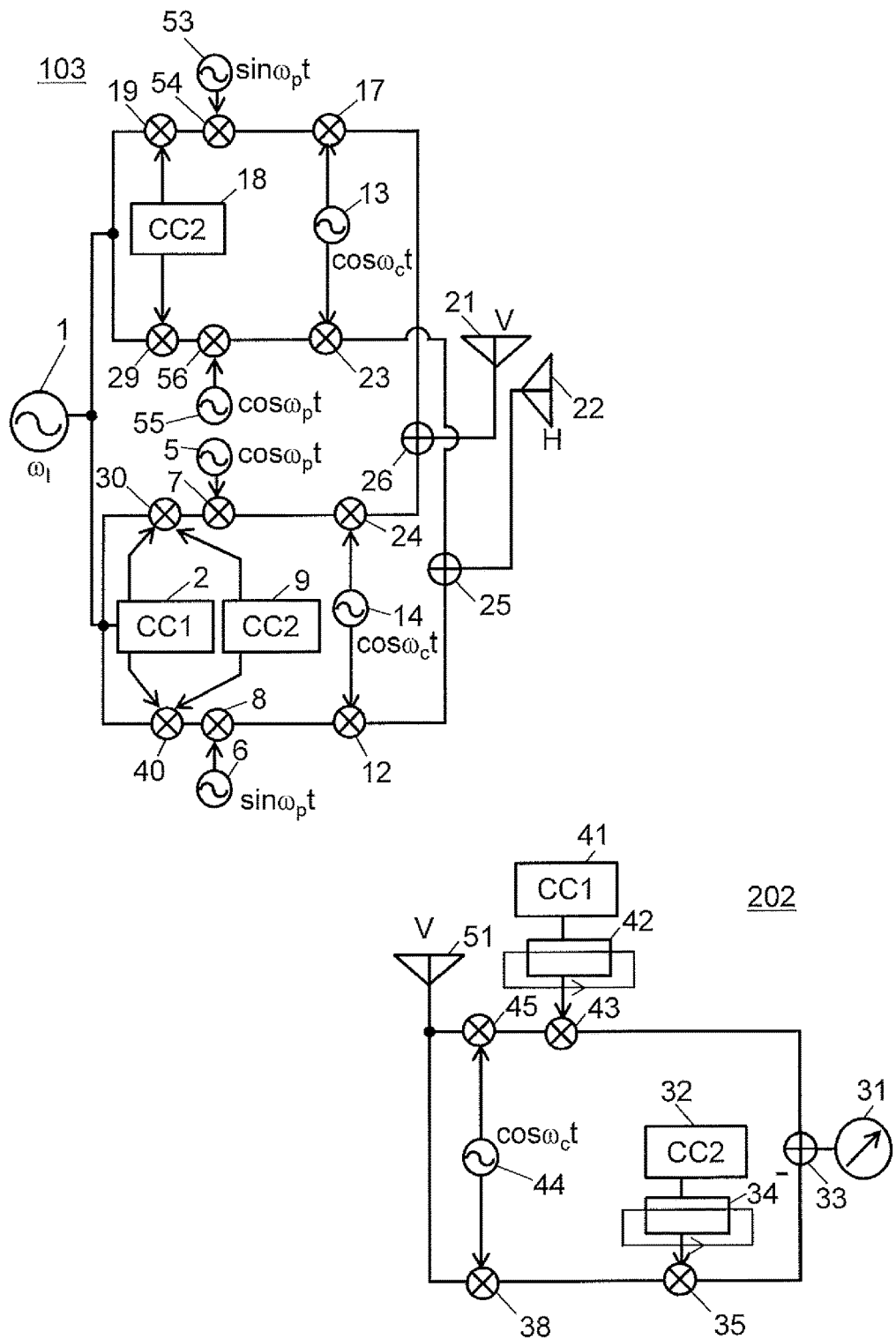
FIG. 4 is a diagram showing an exemplary configuration of a wireless system according to a third embodiment of the present invention.

In a third embodiment of the present invention, a description will be given of an exemplary configuration of a wireless system that uses a plurality of frequencies in an over-the-horizen communication environment to control polarized waves for conducting communication, with reference to FIG. 4. FIG. 4 is a diagram showing an exemplary configuration of a wireless system according to a third embodiment of the present invention. In FIG. 4, a transmitter 103 and a receiver 202 as radio devices constitute a wireless system. The transmitter 103 and receiver 202 in FIG. 4 are obtained by partly modifying the transmitter 102 and receiver 201 in FIG. 3, and the description will be given by mainly focusing on those modified portions.

<Configuration of Transmitter 103>

The configuration of the transmitter 103 in FIG. 4 differs from that of the transmitter 102 in FIG. 3 on the point that a second transmission code (CC2) generator 9 is newly included in FIG. 4. Additionally, in FIG. 4, the transmission multiplier 3 and transmission multiplier 4 in FIG. 3 are replaced with a transmission multiplier 30 and a transmission multiplier 40, respectively. The transmission multiplier 30 is inputted with the information signal ($\omega_I$), the first reception code CC1, and the second reception code CC2, to execute the following calculation;

$$(\omega_I) \times (CC1) + (\omega_I) \times (CC2).$$

Then, this output signal is inputted to the first input of the transmission multiplier 7. Also, the transmission multiplier 40 is inputted with the information signal ($\omega_I$), the first reception code CC1, and the second reception code CC2, to execute the following calculation;

$$(\omega_I) \times (CC1) + (\omega_I) \times (CC2).$$

Then, this output signal is inputted to the first input of the transmission multiplier 8.

With the above configuration, the outputs of the transmission multiplier 30 and transmission multiplier 40 both have a self-correlation property equal to or more than a predetermined value as well as a cross-correlation property equal to or less than an another predetermined value. The other part of the configuration of the transmitter 103 in FIG. 4 is the same as that of the transmitter 102 in FIG. 3, and therefore any duplicate description will be omitted.

<Configuration of Receiver 202>

The receiver 202 in FIG. 4 has a configuration in which the reception antenna (H) 52, the reception multiplier 39, the reception carrier wave generator 37, and the reception combiner 36 are eliminated from that of the receiver 201 in FIG. 3. In the receiver 202 in FIG. 4, the reception multiplier 38 is inputted with the carrier wave (cos $\omega$ct) from the reception carrier wave generator 44, and the output signal is directly inputted to a first input of the reception multiplier 35. The other part of the configuration of the receiver 202 in FIG. 4 is the same as that of the receiver 201 in FIG. 3, and any duplicate description will be omitted.

<Operation of Wireless System of Third Embodiment>

The wireless system of the third embodiment described above operates in the same way as with the wireless system of the second embodiment in FIG. 3 with respect to receiving the circularly polarized wave superimposed with the code as an output of the first transmission code (CC1) generator 2. In addition, the same information signals through two circularly polarized waves, orthogonal to each other, superimposed with the code as an output of the second transmission code (CC2) generator arrives at the receiving point where the receiver 202 is arranged. Accordingly, the signal is demodulated by one reception antenna 51 at any time within one period of the circularly polarized wave, except for a very rare exceptional case where the direction of arrival of a predetermined propagation path coincides with the orientation of the reception antenna 51.

Advantageous Effects of Third Embodiment

The receiver 202 in the third embodiment requires only one antenna (51), and the reception multiplier 39 and the reception combiner 36 are eliminated, as compared with the receiver 201 in the second embodiment. In other words, the third embodiment has advantageous effects of providing a receiver with a simple and compact structure to reduce size, power consumption, and costs of a wireless network having high reliability and security in which a large number of terminals are connected with one another.

Fourth Embodiment

Figure 5:
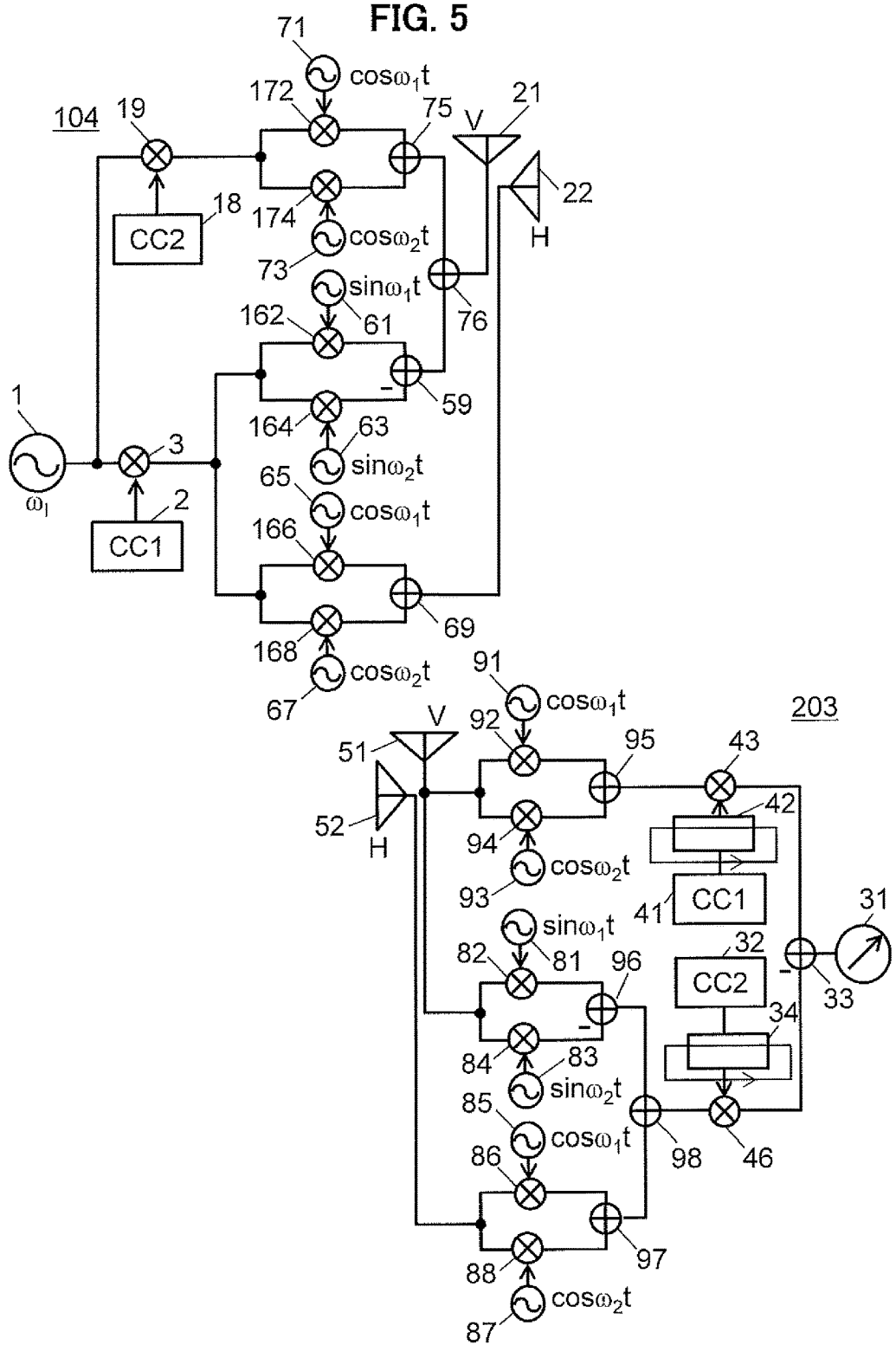
FIG. 5 is a diagram showing an exemplary configuration of a wireless system according to a fourth embodiment of the present invention.

In a fourth embodiment of the present invention, a description will be given of an exemplary configuration of a wireless system that uses a plurality of frequencies in an over-the-horizen communication environment to control polarized waves for conducting communication, with reference to FIG. 5. FIG. 5 is a diagram showing an exemplary configuration of a wireless system according to a fourth embodiment of the present invention. In FIG. 5, a transmitter 104 and a receiver 203 as radio devices constitute a wireless system.

<Configuration of Transmitter 104>

The transmitter 104 in FIG. 5 includes the information signal ($\omega_I$) generator 1, the first transmission code (CC1) generator 2, the second transmission code (CC2) generator 18, transmission multipliers 3, 19, 162, 164, 166, 168, 172, 174, transmission combiners 69, 75, 76, transmission subtractor 59, first-transmission-frequency-based cosine generators 65, 71, second-transmission-frequency-based cosine generator 67, 73, a first-transmission-frequency-based sine generator 61, a second-transmission-frequency-based sine generator 63, the transmission antenna (V) 21, and the transmission antenna (H) 22.

Basic functions of the information signal ($\omega_I$) generator 1, the transmission multipliers 3, 19, 162, 164, 166, 168, 172, 174, the transmission combiners 69, 75, 76, the first transmit code (CC1) generator 2, the second transmission code (CC2) generator 18, the transmission antenna (V) 21, and the transmission antenna (H) 22 are the same as those in the first embodiment, and therefore descriptions thereof will be omitted. The transmission subtractor 59 has a function of taking the difference between two signals. The first-transmission-frequency-based cosine generators 65, 71 generate a carrier wave (cos $\omega_1 t$). The second-transmission-frequency-based cosine generators 67, 73 generate a carrier wave (cos $\omega_2 t$). The first-transmission-frequency-based sine generator 61 generates a carrier wave (sin $\omega_1 t$). The second-transmission-frequency-based sine generator 63 generates a carrier wave (sin $\omega_2 t$).

<<Connection Between Components>>

The output signal of the information signal ($\omega$l) generator 1 flows through two paths. The output signal in one of the two paths is inputted to the first input of the transmission multiplier 19. The output signal in the other of the two paths is inputted to the first input of the transmission multiplier 3.

The second input of the transmission multiplier 19 is inputted with the transmission code (CC2) from the second transmission code (CC2) generator 18, and the information signal ($\omega_I$) is superimposed with the transmission code (CC2) so as to be spread. The output signal of the transmission multiplier 19 flows through two paths. The output signal in one of the two paths is inputted to a first input of the transmission multiplier 172. A second input of the transmission multiplier 172 is inputted with the carrier wave (cos $\omega_1 t$) from the first-transmission-frequency-based cosine generator 71. An output signal of the transmission multiplier 172 is inputted to a first input of the transmission combiner 75. The output signal of the transmission multiplier 19 in the other of the two paths is inputted to a first input of the transmission multiplier 174. A second input of the transmission multiplier 174 is inputted with the carrier wave (cos $\omega_2 t$) from the second-transmission-frequency-based cosine generator 73. An output signal of the transmission multiplier 174 is inputted to a second input of the transmission combiner 75. The transmission combiner 75 adds the output signal of the transmission multiplier 172 and the output signal of the transmission multiplier 174 to combine them.

The second input of the transmission multiplier 3 is inputted with the transmission code (CC1) from the first transmission code (CC1) generator 2, and the information signal ($\omega_I$) is superimposed with the transmission code (CC1) so as to be spread. The output signal of the transmission multiplier 3 flows through two paths. The output signal in one of the two paths flows through further two paths so as to be inputted to a first input of the transmission multiplier 162 and a first input of the transmission multiplier 164, respectively. The output signal of the transmission multiplier 3 in the other of the two paths flows through further two paths so as to be inputted to a first input of the transmission multiplier 166 and a first input of the transmission multiplier 168, respectively.

A second input of the transmission multiplier 162 is inputted with the carrier wave (sin $\omega_1 t$) from the first-transmission-frequency-based sine generator 61. An output signal of the transmission multiplier 162 is inputted to a first input of the transmission subtractor 59. A second input of the transmission multiplier 164 is inputted with the carrier wave (sin $\omega_2 t$) from the second-transmission-frequency-based sine generator 63. An output signal of the transmission multiplier 164 is inputted to a second input of the transmission subtractor 59. The transmission subtractor 59 subtracts the output signal of the transmission multiplier 164 from the output signal of the transmission multiplier 162 to take a difference. Note that the transmission subtractor 59 takes the difference between the component including the carrier wave (sin $\omega_1 t$) and the component including the carrier wave (sin $\omega_2 t$), and taking the difference causes the two circularly polarized waves to be generated in a subsequent step to rotate in different directions from each other, such as clockwise and counterclockwise. Additionally, the two circularly polarized waves, respectively rotating clockwise and counterclockwise, are two circularly polarized waves which are temporally orthogonal to each other.

A second input of the transmission multiplier 166 is inputted with the carrier wave (cos $\omega_1 t$) from the first-transmission-frequency-based cosine generator 65. An output signal of the transmission multiplier 166 is inputted to a first input of the transmission combiner 69. A second input of the transmission multiplier 168 is inputted with the carrier wave (cos $\omega_2 t$) from the second-transmission-frequency-based cosine generator 67. An output signal of the transmission multiplier 168 is inputted to a second input of the transmission combiner 69. The transmission combiner 69 combines the output signal of the transmission multiplier 166 and the output signal of the transmission multiplier 168. An output signal of the transmission combiner 69 is inputted to the antenna (H) 22.

An output signal of the transmission combiner 75 is inputted to a first input of the transmission combiner 76. An output signal of the transmission subtractor 59 is inputted to a second input of the transmission combiner 76. The transmission combiner 76 combines the output signal of the transmission combiner 75 and the output signal of the transmission subtractor 59. An output signal of the transmission combiner 76 is inputted to the antenna (V) 21.

The antenna (V) 21 converts the output signal of the transmission combiner 76 into an electromagnetic wave (radio wave) and emits the wave into the air. The antenna (H) 22 converts the output signal of the transmission combiner 69 into an electromagnetic wave (radio wave) and emits the wave into the air. Note that the antenna (V) 21 and the antenna (H) 22 are both polarized wave antennas that output polarized waves, and the antenna (V) 21 and the antenna (H) 22 are arranged so as to be spatially orthogonal to each other.

<Configuration of Receiver 203>

Next, the configuration of the receiver 203 will be described. In FIG. 5, the receiver 203 includes the reception antenna (V) 51, the reception antenna (H) 52, reception multipliers 43, 46, 82, 84, 86, 88, 92, 94, first-reception-frequency-based cosine generators 85, 91, second-reception-frequency-based cosine generators 87, 93, a first-receptionfrequency-based sine generator 81, a second-reception-frequency-based sine generator 83, reception combiners 95, 97, 98, reception subtractors 33, 96, the first reception code (CC1) generator 41, the second reception code (CC2) generator 32, the reception sliding correlators 34, 42, and the signal detection circuit 31.

Basic functions of the reception antenna (V) 51, the reception antenna (H) 52, the reception multipliers 43, 46, 82, 84, 86, 88, 92, 94, the reception combiners 95, 97, 98, the reception subtractors 33, 96, the first reception code (CC1) generator 41, the second reception code (CC2) generator 32, the reception sliding correlators 34, 42, and the signal detection circuit 31 are the same as those in the first embodiment, and therefore descriptions thereof will be omitted. The first-reception-frequency-based cosine generators 85, 91, the second-reception-frequency-based cosine generators 87, 93, the first-reception-frequency-based sine generator 81, and the second-reception-frequency-based sine generator 83 respectively correspond to the first-transmission-frequency-based cosine generators 65, 71, the second-transmission-frequency-based cosine generators 67, 73, the first-transmission-frequency-based sine generator 61, and the second-transmission-frequency-based sine generator 63 of the transmitter 104 in FIG. 5, to generate $\cos \omega_1 t$, $\cos \omega_2 t$, $\sin \omega_1 t$, and $\sin \omega_2 t$, respectively.

<<Connection Between Components>>

Incident electromagnetic waves from the reception antenna (V) 51 and the reception antenna (H) 52 are respectively converted into electric signals. The received signal from the reception antenna (V) 51 flows through two paths. The received signal in one of the two paths flows through further two paths so as to be inputted to a first input of the reception multiplier 92 and a first input of the reception multiplier 94, respectively. The received signal from the reception antenna (V) 51 in the other of the two paths flows through further two paths so as to be inputted to a first input of the reception multiplier 82 and a first input of the reception multiplier 84, respectively.

The received signal from the reception antenna (H) 52 flows through two paths. The received signal in one of the two paths is inputted to a first input of the reception multiplier 86. The received signal from the reception antenna (H) 52 in the other of the two paths is inputted to a first input of the reception multiplier 88.

A second input of the reception multiplier 92 is inputted with a signal corresponding to the carrier wave ($\cos \omega_1 t$) from the first-reception-frequency-based cosine generator 91, and a signal having the carrier wave ($\cos \omega_1 t$) removed from the received signal in the carrier multiplier 92, i.e., down-converted signal, is outputted. A second input of the reception multiplier 94 is inputted with a signal corresponding to the carrier wave ($\cos \omega_2 t$) from the second-reception-frequency-based cosine generator 93, and a signal having the carrier wave ($\cos \omega_2 t$) removed from the received signal in the carrier multiplier 94, i.e., down-converted signal, is outputted. An output signal of the reception multiplier 92 is inputted to a first input of the reception combiner 95. An output signal of the reception multiplier 94 is inputted to a second input of the reception combiner 95. The reception combiner 95 combines (adds) the output signal of the reception multiplier 92 and the output signal of the reception multiplier 94 to output the result.

A second input of the reception multiplier 82 is inputted with a signal corresponding to the carrier wave ($\sin \omega_1 t$) from the first-reception-frequency-based sine generator 81, and a signal having the carrier wave ($\sin \omega_1 t$) removed from the reception signal in the reception multiplier 82, i.e., down-converted signal, is outputted. A second input of the reception multiplier 84 is inputted with a signal corresponding to the carrier wave ($\sin \omega_2 t$) from the second-reception-frequency-based sine generator 83, and a signal having the carrier wave ($\sin \omega_2 t$) removed from the received signal in the reception multiplier 84, i.e., down-converted signal, is outputted. An output signal of the reception multiplier 82 is inputted to a first input of the reception subtractor 96. An output signal of the reception multiplier 84 is inputted to a second input of the reception subtractor 96. The reception subtractor 96 takes the difference (executes subtraction) between the output signal of the reception multiplier 82 and the output signal of the reception multiplier 84 to output the result.

A second input of the reception multiplier 86 is inputted with a signal corresponding to the carrier wave ($\cos \omega_1 t$) from the first-reception-frequency-based cosine generators 85, and a signal having the carrier wave ($\cos \omega_1 t$) removed from the received signal in the reception multiplier 86, i.e., down-converted signal, is outputted. A second input of the reception multiplier 88 is inputted with a signal corresponding to the carrier wave ($\cos \omega_2 t$) from the second-reception-frequency-based cosine generator 87, and a signal having the carrier wave ($\cos \omega_2 t$) removed from the received signal in the reception multiplier 88, i.e., down-converted signal, is outputted. An output signal of the reception multiplier 86 is inputted to a first input of the reception combiner 97. An output signal of the reception multiplier 88 is inputted to a second input of the reception combiner 97. The reception combiner 97 combines (adds) the output signal of the reception multiplier 86 and the output signal of the reception multiplier 88 to output the result.

An output signal of the reception subtractor 96 is inputted to a first input of the reception combiner 98. An output signal of the reception combiner 97 is inputted to a second input of the reception combiner 98. The reception combiner 98 combines (adds) the output signal of the reception subtractor 96 and the output signal of the reception combiner 97 to output the result.

The code as an output of the first reception code (CC1) generator 41 is inputted to the reception sliding correlator 42. The output signal of the reception sliding correlator 42 is inputted to the second input of the reception multiplier 43. The first input of the reception multiplier 43 is inputted with an output signal of the reception combiner 95. The reception multiplier 43 is used for multiplication using the output of the first reception code (CC1) generator 41 which causes a correlation calculation by the first reception sliding correlator 42 to result in the maximum correlation.

The code as an output of the second reception code (CC2) generator 32 is inputted to the reception sliding correlator 34. The output signal of the reception sliding correlator 34 is inputted to a second input of the reception multiplier 46. A first input of the reception multiplier 46 is inputted with an output signal of the reception combiner 98. The reception multiplier 46 is used for multiplication using the output of the second reception code (CC2) generator 32 which causes a correlation calculation by the second reception sliding correlator 34 to result in the maximum correlation. Note that the correlation calculation in this case is a calculation of determining how much the transmission code (CC2) on the transmission side in the received signal inputted from the reception antenna 52 and the reception code (CC2) from the second reception code (CC2) generator 32 are correlated (coincide) with each other. Alternatively, the transmission code (CC2) and the transmission code (CC1) may be used to detect that a plurality of signals through a plurality of propagation paths are different from one another, that is, to detect that a correlation calculation results in a low correlation.

The output of the reception multiplier 43 is inputted to the first input of the reception subtractor 33. The output of the reception multiplier 46 is inputted to the second input of the reception subtractor 33. The output of the reception subtractor 33 is the difference between the signal inputted to the first input and the signal inputted to the second input, as an output signal. The output signal of the reception subtractor 33 is inputted to the signal detection circuit 31. The signal detection circuit 31 detects the signal.

<Operation of Wireless System of Fourth Embodiment>

The wireless system of the fourth embodiment described above transmits the information signal through a circularly polarized wave, which is superimposed with the code as an output of the first transmission code (CC1) generator 2 in the transmitter 104, to the receiver 203, and additionally receives the same information signal superimposed with the different codes as a combined wave of two statically polarized waves having different frequencies, orthogonal to each other. Therefore, on the condition that different codes have a low overall correlation value, the receiver 203 is capable of separately demodulate the signals with two different frequencies from the separate polarized waves, orthogonal to each other. That is, the wireless system is capable of continuously capturing the received signal.

Advantageous Effects of Fourth Embodiment

According to the fourth embodiment, the same advantageous effects as those in the first embodiment shown in FIG. 1 are achieved by concurrently using two carrier wave frequencies ($\omega 1$, $\omega 2$) to have advantageous effects of increasing the information transmission capacity as a wireless system.

Fifth Embodiment

Figure 6:
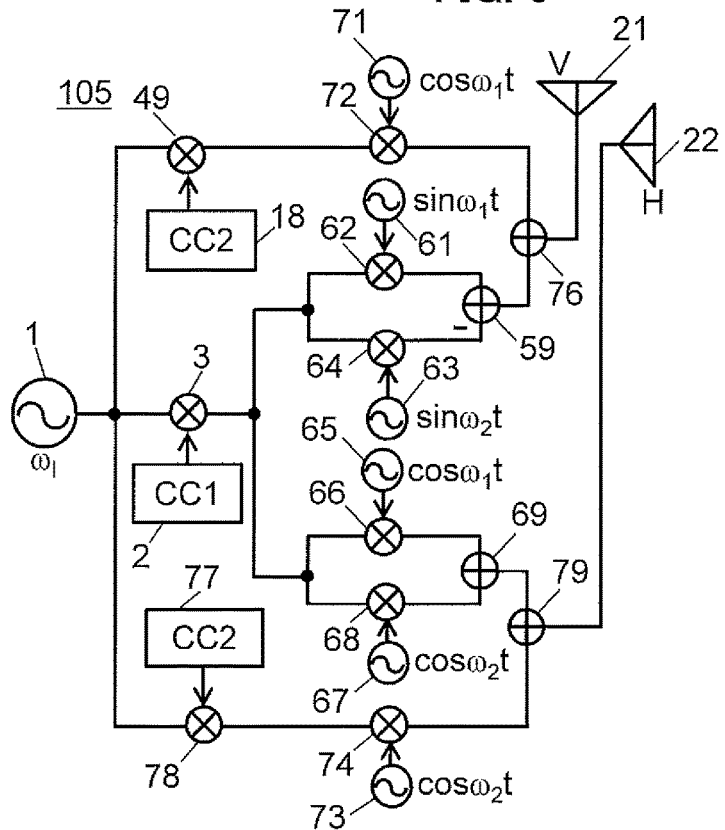
FIG. 6 is a diagram showing an exemplary configuration of a wireless system according to a fifth embodiment of the present invention.
Figure 6:
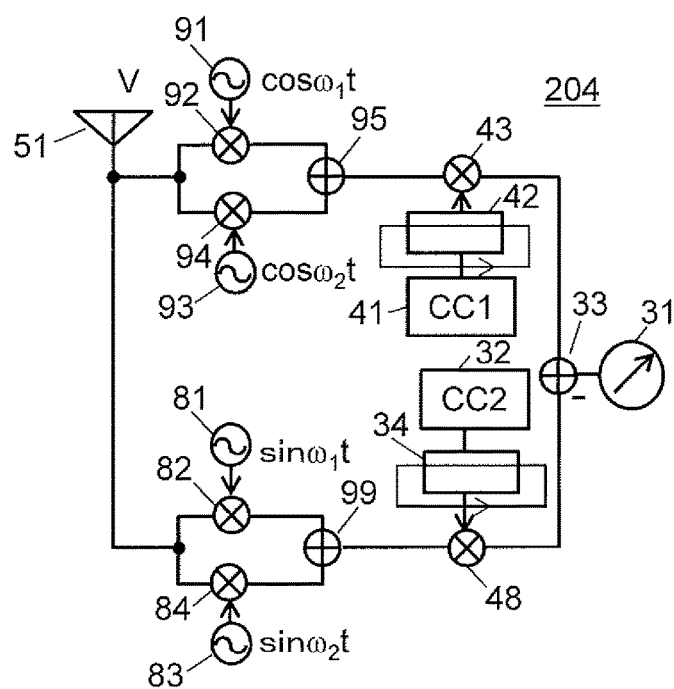

In a fifth embodiment of the present invention, a description will be given of an exemplary configuration of a wireless system that uses a plurality of frequencies in an over-the-horizon communication environment to control polarized waves for conducting communication, with reference to FIG. 6. FIG. 6 is a diagram showing an exemplary configuration of a wireless system according to a fifth embodiment of the present invention. In FIG. 6, a transmitter 105 and a receiver 204 as radio devices constitute a wireless system.

<Configuration of Transmitter 105>

The transmitter 105 in FIG. 6 includes the information signal ($\omega_I$) generator 1, the first transmission code (CC1) generator 2, second transmission code (CC2) generators 18, 77, transmission multipliers 3, 49, 62, 64, 66, 68, 72, 74, 78, transmission combiners 69, 76, 79, the transmission subtractor 59, the first-transmission-frequency-based cosine generators (cos $\omega_1 t$) 65, 71, the second-transmission-frequency-based cosine generators (cos $\omega_2 t$) 67, 73, the first-transmission-frequency-based sine generator (sin $\omega_1 t$) 61, the second-transmission-frequency-based sine generator (sin $\omega_2 t$) 63, the transmission antenna (V) 21, and the transmission antenna (H) 22. Basic functions of the above-described components are the same as those described in the fourth embodiment, and therefore descriptions thereof will be omitted.

<<Connection Between Components>>

The output signal of the information signal ($\omega_I$) generator 1 flows through three paths. The output signal in a first of the three paths is inputted to a first input of the transmission multiplier 49. The output signal in a second of the three paths is inputted to the first input of the transmission multiplier 3. The output signal in a third of the three paths is inputted to a first input of the transmission multiplier 78.

A second input of the transmission multiplier 49 is inputted with the transmission code (CC2) from the second transmission code (CC2) generator 18, and the information signal ($\omega_I$) is superimposed with the transmission code (CC2) so as to be spread. An output signal of the transmission multiplier 49 is inputted to a first input of the transmission multiplier 72.

The first input of the transmission multiplier 3 is inputted with the transmission code (CC1) from the first transmission code (CC1) generator 2, and the information signal ($\omega_I$) is superimposed with the transmission code (CC1) so as to be spread. The output signal of the transmission multiplier 3 flows through two paths. The output signal in one of the two paths flows through further two paths so as to be inputted to a first input of the transmission multiplier 62 and a first input of the transmission multiplier 64, respectively. The output signal from the transmission multiplier 3 in the other of the two paths flows through further two paths so as to be inputted to a first input of the transmission multiplier 66 and a first input of the transmission multiplier 68, respectively.

A second input of the transmission multiplier 78 is inputted with the transmission code (CC2) from the second transmission code (CC2) generator 77, and the information signal ($\omega_I$) is superimposed with the transmission code (CC2) so as to be spread. An output signal of the transmission multiplier 78 is inputted to a first input of the transmission multiplier 74.

A second input of the transmission multiplier 72 is inputted with the carrier wave signal (cos $\omega_1 t$) from the first-transmission-frequency-based cosine generator 71, and the output signal of the transmission multiplier 49 is superimposed (modulated) with the carrier wave signal (cos $\omega_1 t$). An output signal of the transmission multiplier 72 is inputted to a first input of the transmission combiner 76.

A second input of the transmission multiplier 74 is inputted with the carrier wave signal (cos $\omega_2 t$) from the second-transmission-frequency-based cosine generator 73, and the output signal of the transmission multiplier 78 is superimposed (modulated) with the carrier wave signal (cos $\omega_2 t$). An output signal of the transmission multiplier 74 is inputted to a second input of the transmission combiner 79.

A second input of the transmission multiplier 62 is inputted with the carrier wave signal (sin $\omega_1 t$) from the first-transmission-frequency-based sine generator 61, and the output signal of the transmission multiplier 3 is superimposed (modulated) with the carrier signal (sin $\omega_1 t$). An output signal of the transmission multiplier 62 is inputted to the first input of the transmission subtractor 59.

A second input of the transmission multiplier 64 is inputted with the carrier wave signal (sin $\omega_2 t$) from the second-transmission-frequency-based sine generator 63, and the output signal of the transmission multiplier 3 is superimposed (modulated) with the carrier wave signal (sin $\omega_2 t$). An output signal of the transmission multiplier 64 is inputted to the second input of the transmission subtractor 59.

A second input of the transmission multiplier 66 is inputted with the carrier wave signal (cos $\omega_1 t$) from the first-transmission-frequency-based cosine generator 65, and the output signal of the transmission multiplier 3 is superimposed (modulated) with the carrier wave signal (cos $\omega_1 t$). An output signal of the transmission multiplier 66 is inputted to the first input of the transmission combiner 69.

A second input of the transmission multiplier 68 is inputted with the carrier wave signal (cos $\omega_2 t$) from the second-transmission-frequency-based cosine generator 67, and the output signal of the transmission multiplier 3 is superimposed (modulated) with the carrier wave signal (cos $\omega_2 t$). An output signal of the transmission multiplier 68 is inputted to the second input of the transmission combiner 69.

The output signal of the transmission subtractor 59 is inputted to a second input of the transmission combiner 76. The transmission combiner 76 combines (adds) the output signal of the transmission multiplier 72 and the output signal of the transmission subtractor 59 to output the result to the transmission antenna (V) 21.

The output signal of the transmission combiner 69 is inputted to a first input of the transmission combiner 79. The transmission combiner 79 combines (adds) the output signal of the transmission multiplier 74 and the output signal of the transmission combiner 69 to output the result to the transmission antenna (H) 22.

The transmission antenna (V) 21 converts the electric signal outputted from the transmission combiner 76 into an electromagnetic wave (radio wave), and emits the wave into the air. The transmission antenna (H) 22 converts the electric signal outputted from the transmission combiner 79 into an electromagnetic wave (radio wave), and emits the wave into the air. Note that as described above, both the antenna (V) 21 and the antenna (H) 22 are polarized wave antennas that output polarized waves, and the antenna (V) 21 and the antenna (H) 22 are arranged so as to be spatially orthogonal to each other.

With the above configuration, the information signal superimposed with the output of the first transmission code (CC1) generator 2 is transmitted through the circularly polarized waves with two different frequencies ($\omega 1$, $\omega 2$). Note that the transmission subtractor 59 takes the difference between the component including the carrier wave (sin $\omega_1 t$) and the component including the carrier wave (sin $\omega_2 t$), and taking the difference causes the two circularly polarized waves to be generated in a subsequent step to rotate in different directions from each other, such as clockwise and counterclockwise. Additionally, the two circularly polarized waves, respectively rotating clockwise and counterclockwise, are two circularly polarized waves which are temporally orthogonal to each other.

<Configuration of Receiver 204>

Next, the configuration of the receiver 204 will be described. The receiver 204 in FIG. 6 has a configuration in which the reception multipliers 86, 88, the first-reception-frequency-based cosine generator 85, the second-reception-frequency-based cosine generator 87, and the reception combiners 97, 98 are eliminated from that of the receiver 203 in FIG. 5. In addition, a reception combiner 99 in FIG. 6 replaces the reception subtractor 96 in FIG. 5. Further, a reception multiplier 48 in FIG. 6 plays the same role as the reception multiplier 46 in FIG. 5. The other part of the configuration in FIG. 6 is the same as that in the fourth embodiment in FIG. 5, and therefore a description thereof will be omitted.

<Operation of Wireless System of Fifth Embodiment>

In the wireless system of the fifth embodiment in FIG. 6 as configured above, the information signal superimposed with the output of the first transmission code (CC1) generator is transmitted from the transmitter 105 through circularly polarized waves with two different frequencies ($\omega 1$, $\omega 2$), as described above. In addition, the information signal superimposed with the output of the second transmission code (CC2) generator is transmitted through two polarized waves, orthogonal to each other, with different frequencies ($\omega 1$, $\omega 2$). These circularly polarized waves and the two polarized waves (statically polarized waves), orthogonal to each other, arrive at the receiver 204. For the information signal superimposed with the output of the first transmission code (CC1) generator, which is received by one reception antenna, the antenna output is lost during a specific time within one period of the circularly polarized wave. However, the information signal superimposed with the output of the second transmission code (CC2) generator, which is also received by one antenna, is surely receivable at all times within one period of the circularly polarized waves by way of using the two polarized waves, orthogonal to each other, with one or other frequency.

Advantageous Effects of Fifth Embodiment

The receiver 204 (in FIG. 6) in the fifth embodiment requires only one antenna (51) and the reception multiplier 86, 87 and the reception combiners 97, 98 are eliminated, as compared with the receiver 203 (in FIG. 5) in the fourth embodiment. In other words, the fifth embodiment has advantageous effects of providing a receiver with a simple and compact structure to reduce size, power consumption, and costs of a wireless network having high reliability and security in which a large number of terminals are connected with one another. In addition, the structure of the radio device of the fifth embodiment requires no coupling of high-frequency analog signals with each other to have advantageous effects that the device can have a long lifetime but requires no adjustment.

Sixth Embodiment

Figure 7:
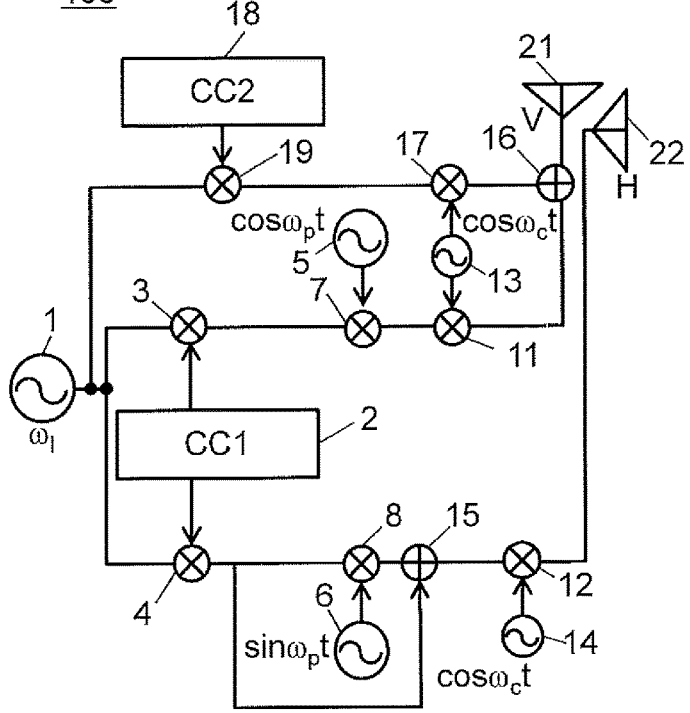
FIG. 7 is a diagram showing an exemplary configuration of a wireless system according to a sixth embodiment of the present invention.
Figure 7:
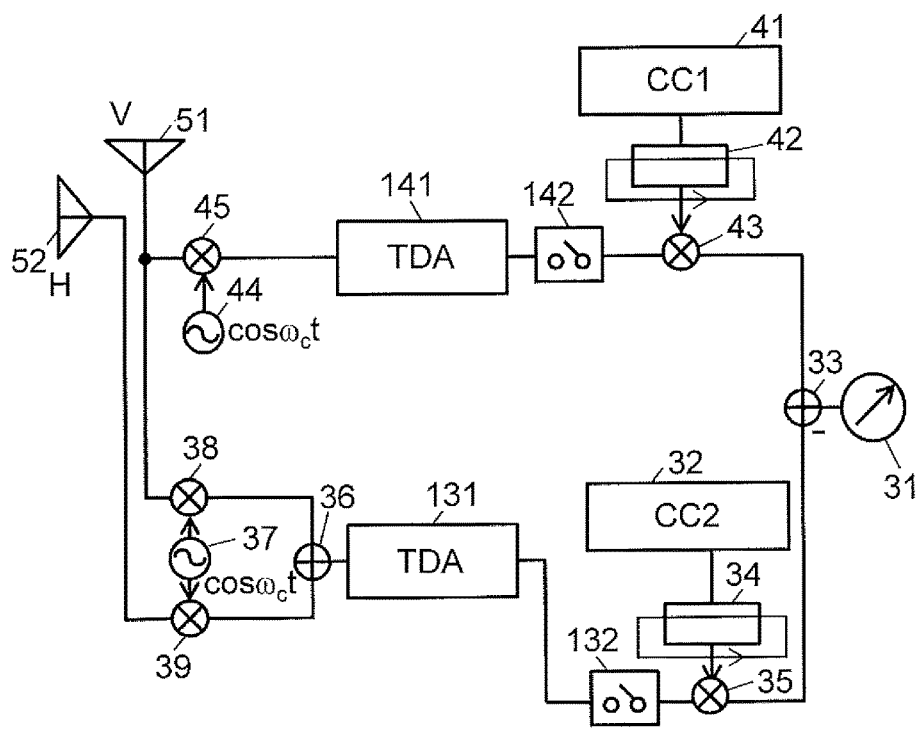

In a sixth embodiment of the present invention, a description will be given of an exemplary configuration of a wireless system that uses a plurality of frequencies in an over-the-horizen communication environment to control polarized waves for conducting communication, with reference to FIG. 7. FIG. 7 is a diagram showing an exemplary configuration of a wireless system according to the sixth embodiment of the present invention. In FIG. 7, a transmitter 106 and a receiver 205 as radio devices constitutes a wireless system.

<Configuration of Transmitter 106>

The transmitter 106 in FIG. 7 of the sixth embodiment has the same configuration as the transmitter 101 in FIG. 1 of the first embodiment, and therefore any duplicate description will be omitted. However, the difference from the first embodiment in FIG. 1 is that the information signal to be transmitted by the transmitter is divided into packets before transmission, as will be described later with reference to FIG. 8.

<Configuration of Receiver 205>

The receiver 205 in FIG. 7 of the sixth embodiment additionally includes time-delay circuit arrays (TDA) 131, 141 and switches 132, 142 with respect to the receiver 201 in FIG. 1 of the first embodiment. That is, the receiver 205 in FIG. 7 includes a subordinate structure of the time-delay circuit array (TDA) 141 and the switch 142 between the reception multiplier 45 and the reception multiplier 43. Also, the receiver includes a subordinate structure of the time-delay circuit array (TDA) 131 and the switch 132 between the reception combiner 36 and the reception multiplier 35.

Figure 8A:
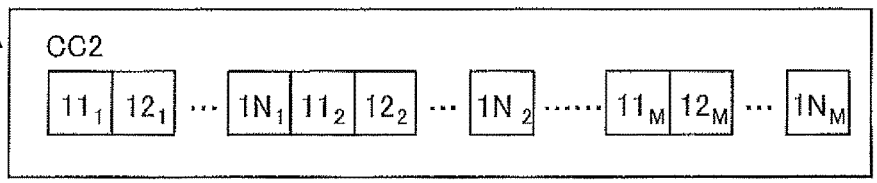
FIGS. 8A to 8F are diagrams illustrating transmission and reception of an information signal divided into packets in a transmitter and a receiver of the sixth embodiment, where
Figure 8B:
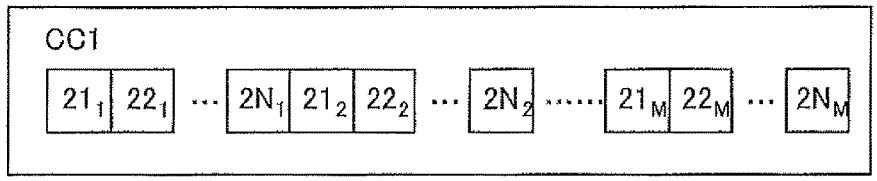
Figure 8C:
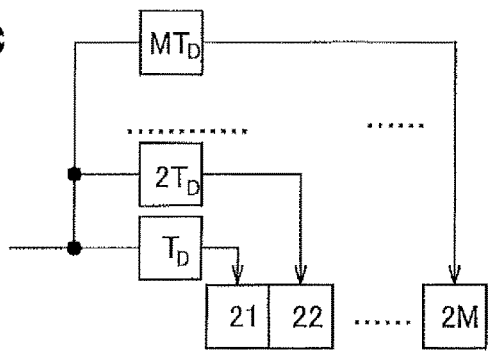
Figure 8D:
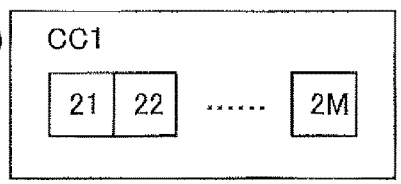
Figure 8E:
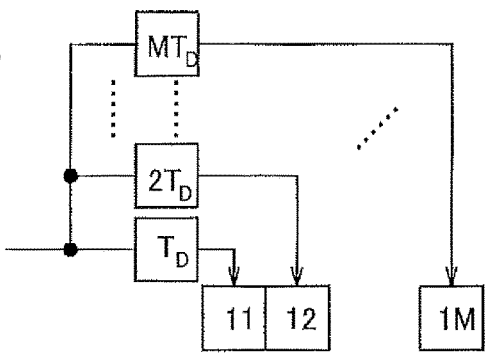
Figure 8F:
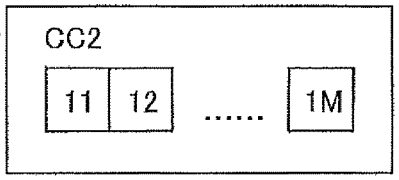

FIGS. 8A to 8F are diagrams illustrating transmission and reception of the information signal divided into packets in the transmitter 106 and receiver 205 in the sixth embodiment, where FIG. 8A shows a code from the second transmission code (CC2) generator in the transmitter 106, FIG. 8B shows a code from the first transmission code (CC1) generator in the transmitter 106, FIG. 8C shows the structure of the time-delay circuit array (TDA) 141 in the receiver 205 and a code, FIG. 8D shows the code from the first transmission code (CC1) generator in the receiver 205, FIG. 8E shows the structure of the time-delay circuit array (TDA) 131 in the receiver 205 and the code, and FIG. 8F shows the code from the second transmission code (CC2) generator in the receiver 205.

The first transmission code (CC1) generator in the transmitter 106 generates a following code, for example, as shown in FIG. 8B;

$21_1, 22_1, ---, 2M_1, 21_2, 22_2, ---, 2M_2, ---$. At the time of generating this code, the code is divided into packets by the number of M as a unit, as follows;

$(21_1, 22_1, ---, 2M_1), (21_2, 22_2, ---, 2M_2), ---$.

As shown in FIG. 8C, the time-delay circuit array (TDA) 141 in the receiver 205 takes in the code at the sequentially incremented integer multiples of a unit time $T_D$ of delay, such as delay $T_D, 2T_D, ---, MT_D$. Then, the following code is extracted from the output signal of the reception multiplier 45 which has been divided into packets by the number of M as a unit;

$(21_1, 22_1, ---, 2M_1)$. Subsequently in the next cycle, the following code is extracted; $(21_2, 22_2, ---, 2M_2)$. The time-delay circuit array (TDA) 141 takes out the code from the first transmission code (CC1) generator in the transmitter 106 in this manner. The switch 142 in the receiver 205 in FIG. 7 is arranged for adjusting the output timing of the code from the time-delay circuit array (TDA) 141.

The signal that has passed through the subordinate structure of the time-delay circuit array (TDA) 141 and the switch 142 is inputted to the first input of the reception multiplier 43. Then, a signal from the first reception code (CC1) generator 41 and reception sliding correlator 42 collectively connected to the second input of the reception multiplier 43 is used to execute a correlation calculation between the transmission code (CC1) and the reception code (CC1).

In addition, the code from the second transmission code (CC2) generator 18 in the transmitter 106 (FIG. 7) is shown in FIG. 8A as follows;

$11_1, 12_1, ---, 1M_1, 11_2, 12_2, ---, 1M_2, ---$. At the time of generating this code, the code is divided into packets by the number of M as a unit, as follows;

$(11_1, 12_1, ---, 1M_1), (11_2, 12_2, ---, 1M_2), ---$.

As shown in FIG. 8E, the time-delay circuit array (TDA) 131 in the receiver 205 takes in the code at the sequentially incremented integer multiples of a unit time $T_D$ of delay, such as delay $T_D, 2T_D, ---, MT_D$. Then, the following code is extracted from the output signal of the reception combiner 36 which has been divided into packets by the number of M as a unit;

$(11_1, 12_1, ---, 1M_1)$. Subsequently in the next cycle, the following code is extracted; $(11_2, 12_2, ---, 1M_2)$.

The signal that has passed through the subordinate structure of the time-delay circuit array (TDA) 131 and the switch 132 is inputted to the first input of the reception multiplier 35. Then, a signal from the second reception code (CC2) generator 32 and the reception sliding correlator 34 collectively connected to the second input of the reception multiplier 35 is used to execute a correlation calculation between the transmission code (CC2) and the reception code (CC2).

As described above, in the sixth embodiment, the information signal $(\omega_I)$ to be transmitted by the transmitter 106 is divided into packets before transmission. Then, the receiver 205 uses a function of identifying and utilizing, at a predetermined time within a period of the circularly polarized wave, the plurality of propagation paths formed between the transmitting and receiving points to divide the information signals to be transmitted into packets so as to be respectively allocated to predetermined timings within one period of the circularly polarized wave. In this manner, the transmitter 106 and the receiver 205 use a timing within the period of the circularly polarized wave for transmitting groups of packets constituting one information signal.

Advantageous Effects of Sixth Embodiment

The sixth embodiment uses a plurality of propagation paths formed between the transmitting and receiving points to allow a plurality of signals to be transmitted concurrently and separately, to improve the throughput of the wireless system and to expand the transmission capacity at the same time.

Seventh Embodiment

Figure 9:
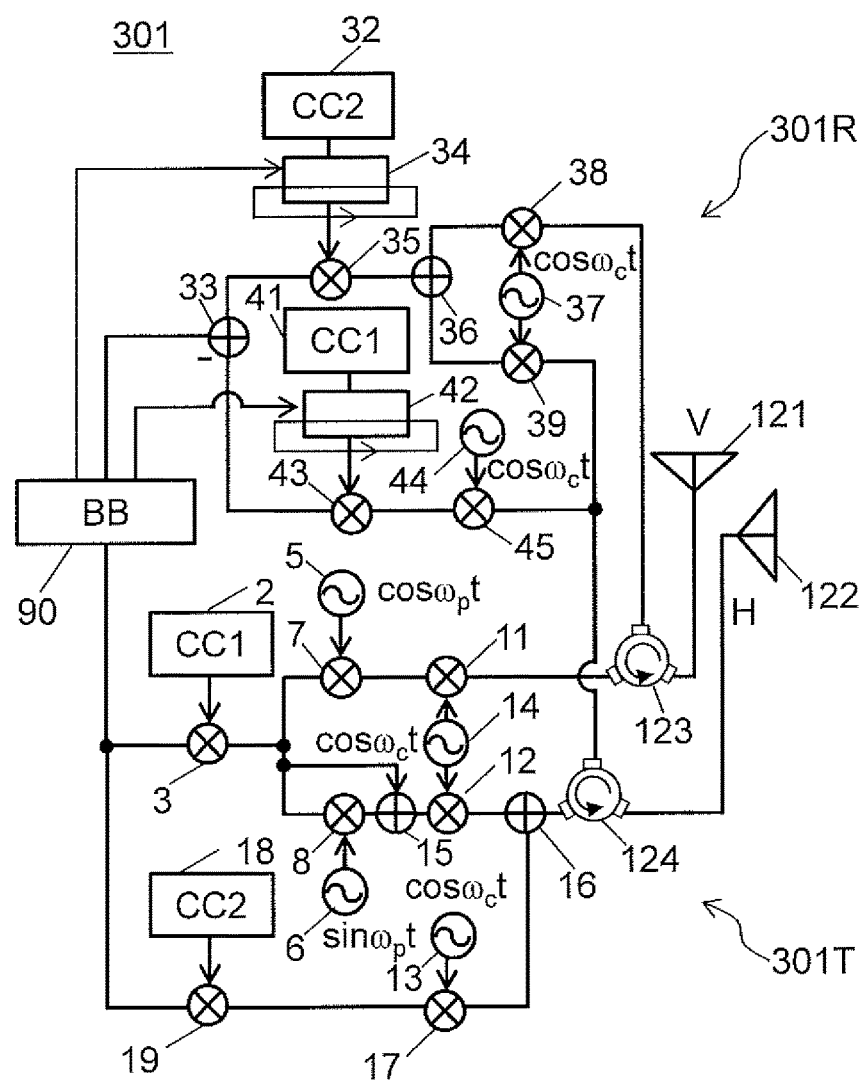
FIG. 9 is a diagram showing an exemplary configuration of a wireless system according to a seventh embodiment of the present invention.

In a seventh embodiment of the present invention, a description will be given of an exemplary configuration of a wireless system that uses a plurality of frequencies in an over-the-horizon communication environment to control polarized waves for conducting communication, with reference to FIG. 9. FIG. 9 is a diagram showing an exemplary configuration of a wireless system according to a seventh embodiment of the present invention. In FIG. 9, a radio device 301 integrating a transmitter (301T) and a receiver (301R) constitute a wireless system. Note that the radio device 301 integrates the transmission and reception functions, and therefore includes circulators 123, 124 for utilizing both an antenna (V) 121 and an antenna (H) 122 as bidirectional antennas.

<Configuration of Transmitter 301T>

In FIG. 9, the components corresponding to the transmitter 101 in FIG. 1 are the first transmission code (CC1) generator 2, the second transmission code (CC2) generator 18, the transmission multipliers 3, 7, 8, 11, 12, 17, 19, the transmission combiners 15, 16, the circularly-polarized-wave frequency-based cosine generator 5, the circularly-polarized-wave frequency-based sine generator 6, the transmission carrier wave generators 13, 14, the antenna (V) 121, and the antenna (H) 122. Note that a baseband (BB) circuit 90 in FIG. 9 includes a circuit corresponding to the information signal $(\omega_I)$ generator 1 in FIG. 1.

<Configuration of Receiver 301R>

In FIG. 9, the components corresponding to the receiver 201 in FIG. 1 are the antennas 121, 122, the reception multipliers 35, 38, 39, 43, 45, the reception carrier wave generators 37, 44, the reception combiner 36, the first reception code (CC1) generator 41, the second reception code (CC2) generator 32, the reception sliding correlators 34, 42, and the reception subtractor 33. Note that the baseband (BB) circuit 90 in FIG. 9 includes a circuit corresponding to the signal detection circuit 31 in FIG. 1. In addition, the reception sliding correlators 34, 42 are controlled by the baseband (BB) circuit 90.

<Shared Components Between Transmitter and Receiver>

The components in FIG. 9 shared between the transmitter 301T and the receiver 301R will be described. The antennas 121, 122 are bidirectionally used by the transmitter 301T and the receiver 301R. In order to bidirectionally use the antennas 121, 122 by the transmitter 301T and the receiver 301R, the circulators 123, 124 are included as described above. In addition, the baseband (BB) circuit 90 in FIG. 9 includes a circuit for the transmitter 301T and a circuit for the receiver 301R, and the circuits exchange signals with each other for control.

Duplicate descriptions will be omitted of parts of the transmitter 301T and receiver 301R in the radio device 301 in FIG. 9 as described above which are the same as those in the transmitter 101 and receiver 201 in FIG. 1.

As described above, the radio device 301 in FIG. 9 structurally combines the transmitter 101 and receiver 201 in FIG. 1 to have corresponding functions.

Advantageous Effects of Seventh Embodiment

The seventh embodiment allows the radio device 301 to implement the functions of the transmitter 101 and receiver 201 of the first embodiment in FIG. 1 with two antennas, spatially orthogonal to each other, and therefore has advantageous effects of reducing size and costs of such a device.

Eighth Embodiment

Figure 10:
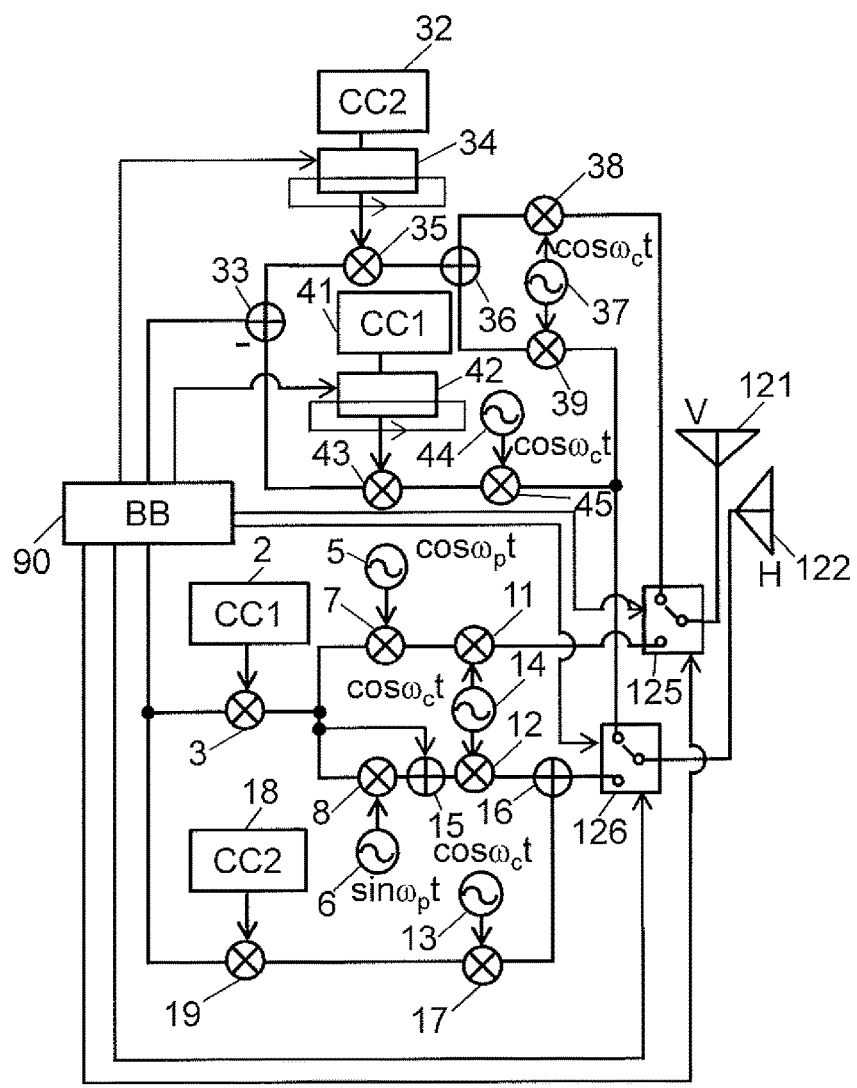
FIG. 10 is a diagram showing an exemplary configuration of a wireless system according to an eighth embodiment of the present invention.

In an eighth embodiment of the present invention, a description will be given of an exemplary configuration of a wireless system that uses a plurality of frequencies in an over-the-horizen communication environment to control polarized waves for conducting communication, with reference to FIG. 10. FIG. 10 is a diagram showing an exemplary configuration of a wireless system according to the eighth embodiment of the present invention. A radio device 302 in FIG. 10 according to the eighth embodiment is different from the radio device 301 in FIG. 9 according to the seventh embodiment on the point that the circulators 123, 124 in FIG. 9 are replaced with switches 125, 126 in FIG. 10. The switches 125, 126 are controlled by the baseband circuit 90 to bidirectionally use both the antenna (V) 121 and the antenna (H) 122 as the transmission and reception antennas. The other part of the configuration of the radio device 302 in FIG. 10 is the same as that of the radio device 301 in FIG. 9. Any duplicate description of the same part will be omitted. The wireless system of the radio device 302 in FIG. 10 according to the eighth embodiment achieves the same functions and advantageous effects in two-way time-division communication as those of the wireless system of the radio device 301 in FIG. 9 according to the seventh embodiment.

Advantageous Effects of Eighth Embodiment

The eighth embodiment has advantageous effects of reducing size, weight, and costs of such a device, because the switches 125, 126 are smaller and lighter than the circulators 123, 124.

Ninth Embodiment

Figure 11:
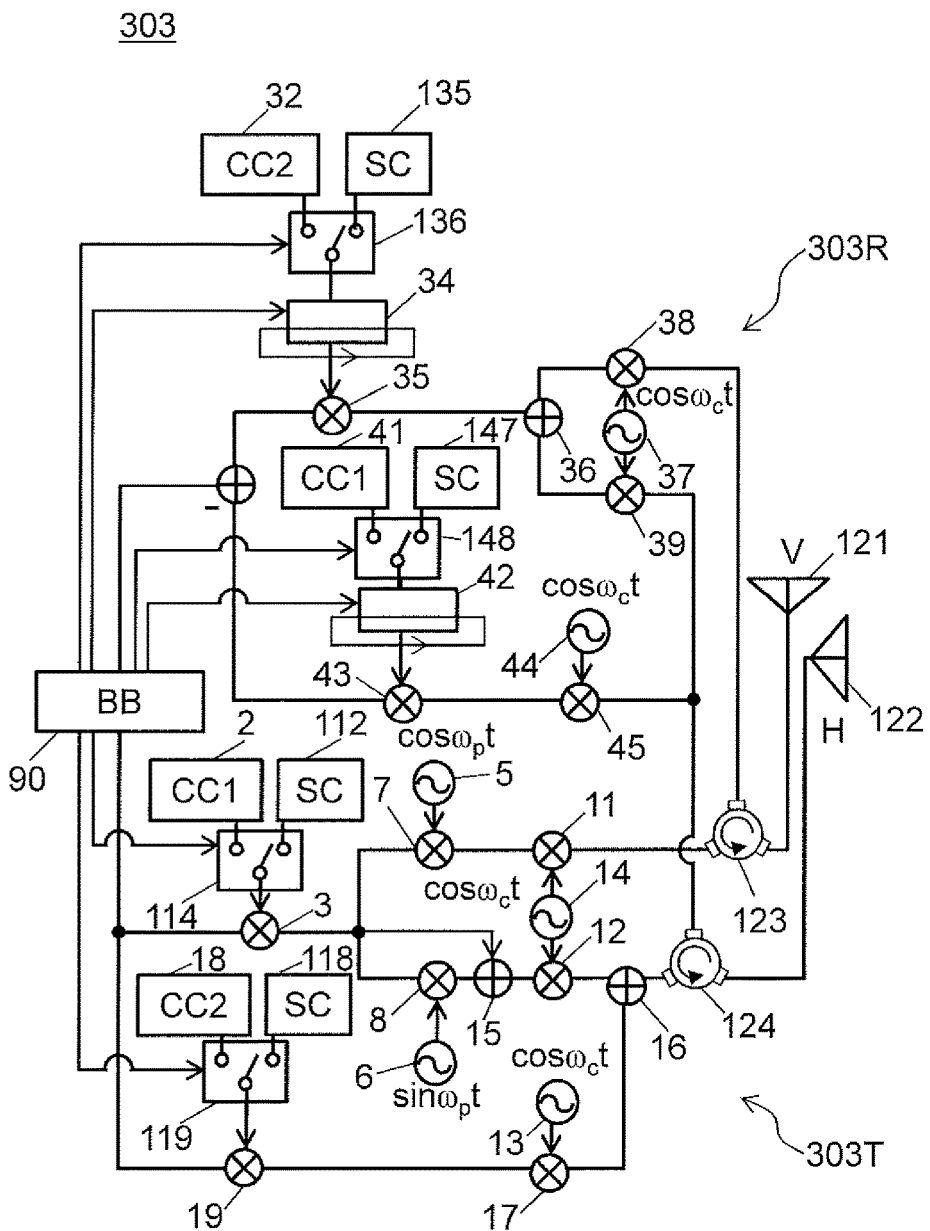
FIG. 11 is a diagram showing an exemplary configuration of a wireless system according to a ninth embodiment of the present invention.

In a ninth embodiment of the present invention, a description will be given of an exemplary configuration of a wireless system that uses a plurality of frequencies in an over-the-horizen communication environment to control polarized waves for conducting communication, with reference to FIG. 11. FIG. 11 is a diagram showing an exemplary configuration of a wireless system according to the ninth embodiment of the present invention. A radio device 303 in FIG. 11 according to the ninth embodiment is different from the radio device 301 in FIG. 9 according to the seventh embodiment on the point that the synchronous code (SC) generator 112, 118, 135, 147, and switches 114, 119, 136, 148 are newly included. Note that the symbol SC in the synchronous code generator is an abbreviation of a Synchronous Code.

The switch 114 is inputted with respective outputs from the synchronous code (SC) generator 112 and the first transmission code (CC1) generator 2, and the output signal of the switch 114 is inputted to the second input of the transmission multiplier 3. The switch 119 is inputted with respective outputs from the synchronous code (SC) generator 118 and the second transmission code (CC2) generator 18, and the output signal of the switch 119 is inputted to the second input of the transmission multiplier 19. The switch 136 is inputted with respective outputs from the synchronous code (SC) generator 135 and the second receive code (CC2) generator 32, and the output signal of the switch 136 is inputted to the reception sliding correlator 34. The switch 148 is inputted with respective outputs from the synchronous code (SC) generator 147 and the first receive code (CC2) generator 41, and the output signal of the switch 148 is inputted to the reception sliding correlator 42.

The switches 114, 119, 136, 148 are respectively controlled by the baseband (BB) circuit 90. The switches 114, 119, 136, 148 allow for using the synchronous codes outputted from the synchronous code (SC) generators 112, 118, 135, 147. The synchronous codes having strong self-correlation outputted from the synchronous code (SC) generators 112, 118, 135, 147, respectively, are used to synchronize different radio devices.

That is, a transmitter 303T of one radio device 303 transmits a signal spread with the synchronous code (SC) at different timings, while a receiver 303R of the other radio device 303 uses a synchronous signal (SC) to establish synchronization with the transmitter 303T of said one radio device 303 for discriminating a plurality of propagation paths temporally formed between the transmitting and receiving points. The other part of the configuration of the radio device 303 in FIG. 11 is the same as that of the radio device 301 in FIG. 9. Any duplicate description of the same part will be omitted.

Advantageous Effects of Ninth Embodiment

According to the ninth embodiment, the synchronous codes having strong self-correlation outputted from the synchronization code generators are used, as described above, to synchronize different radio devices. In addition, the technique of the ninth embodiment uses different times within one period of the circularly polarized wave to identify a plurality of wireless propagation paths between the transmitting and receiving points, to allow the ninth embodiment to improve accuracy of making selections from a plurality of propagation paths formed between the transmitting and receiving points.

Tenth Embodiment

Figure 12:
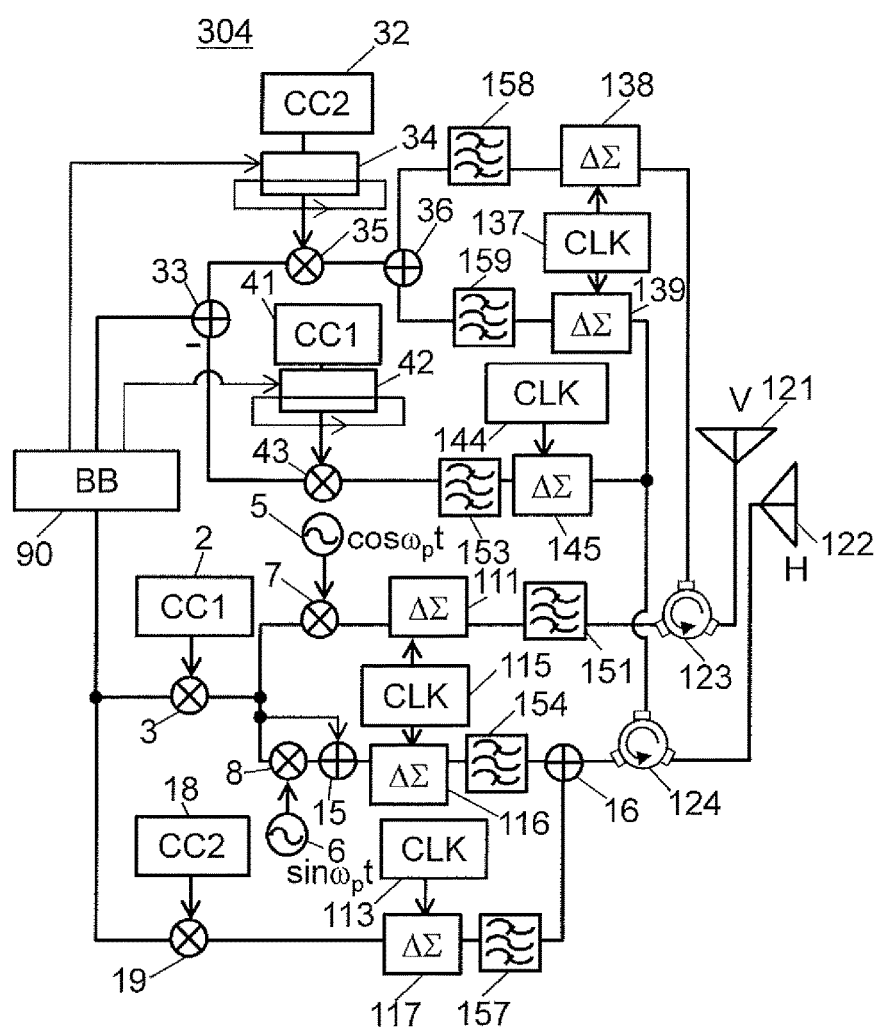
FIG. 12 is a diagram showing an exemplary configuration of a wireless system according to a tenth embodiment of the present invention.

In a tenth embodiment of the present invention, a description will be given of an exemplary configuration of a wireless system that uses a plurality of frequencies in an over-the-horizen communication environment to control polarized waves for conducting communication, with reference to FIG. 12. FIG. 12 is a diagram showing an exemplary configuration of a wireless system according to the tenth embodiment of the present invention. A radio device 304 in FIG. 12 according to the tenth embodiment is different from the radio device 301 in FIG. 9 according to the seventh embodiment on the point that filters 151, 153, 154, 157, 158, 159, delta sigma (ΔΣ) circuits 111, 116, 117, 138, 139, 145, and clock (CLK) generation circuits 113, 115, 137, 144 are newly included in FIG. 12.

Besides, a circuit of the transmission multipliers 11, 12 and transmission carrier wave generator 14 in FIG. 10 is replaced with a circuit of the filters 151, 154, delta sigma (ΔΣ) circuits 111, 116, and clock (CLK) generation circuit 115 in FIG. 12. In addition, a circuit of the transmission multiplier 17 and transmission carrier wave generator 13 in FIG. 10 is replaced with a circuit of the filter 157, delta sigma (ΔΣ) circuit 117, and clock (CLK) generation circuit 113 in FIG. 12. Further, a circuit of the reception multipliers 38, 39, and reception carrier wave generator 37 in FIG. 10 is replaced with a circuit of the filters 158, 159, delta sigma (ΔΣ) circuits 138, 139, and clock (CLK) generation circuit 137 in FIG. 12. Furthermore, a circuit of the reception multiplier 45 and reception carrier wave generator 44 in FIG. 10 is replaced with a circuit of the filter 153, delta sigma (ΔΣ) circuit 145, and clock (CLK) generation circuit 144 in FIG. 12.

The circuit replacements as described above cause the radio device to have equivalent circuits with respect to a function of up-converting or down-converting the information signal. Note that the filters 158, 159, delta sigma (ΔΣ) circuits 138, 139, and clock (CLK) generation circuit 137 in FIG. 12 may all be configured with digital circuits. The other circuits in FIG. 12 are the same as those in FIG. 10, and therefore any duplicate description will be omitted.

Advantageous Effects of Tenth Embodiment

The tenth embodiment allows for implementing a radio device having the same function as the radio device of the seventh embodiment entirely with digital circuits. Accordingly, the tenth embodiment has advantageous effects of extending the lifetime, making no adjustment, and reducing costs and size of a radio device.

Eleventh Embodiment: Elevator Control System

Figure 13:
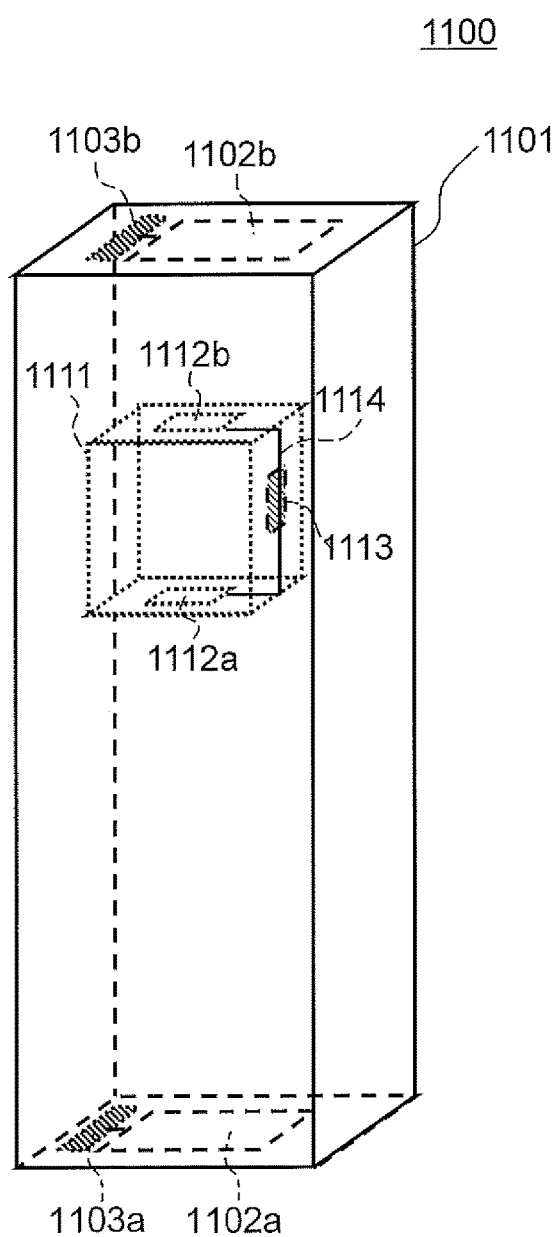
FIG. 13 is a diagram illustrating an exemplary configuration of an elevator control system according to an eleventh embodiment of the present invention.

As an eleventh embodiment of the present invention, a description will be given of an exemplary configuration of an elevator control system 1100 that adopts a wireless system of using a plurality of frequencies to control polarized waves, as described in the first to tenth embodiments of the present invention. FIG. 13 is a diagram illustrating an exemplary configuration of the elevator control system 1100 according to the eleventh embodiment of the present invention. In the elevator control system 1100 in FIG. 13 of the present (eleventh) embodiment, an elevator car 1111 moves up and down inside a building 1101 where the elevator is installed.

Besides, a floor inside the building 1101 is installed with a base-station radio device 1103a, including a transmitter and a receiver which have antennas capable of transmitting and receiving the polarized waves as described in any of the first to tenth embodiments, and a base-station integrated-antenna-for-two-orthogonally-polarized-waves 1102a in combination. Then, a signal generated in the base-station radio device 1103a is transmitted from the base-station integrated-antenna-for-two-orthogonally-polarized-waves 1102a. Note that an integrated antenna for two orthogonally polarized waves is an antenna that integrates two antennas, described such as in the first embodiment, which are arranged to generate radio waves so as to be spatially orthogonal to each other. That is, the base-station integrated-antenna-for-two-orthogonally-polarized-waves 1102a is composed of two orthogonal antennas (the first and second transmission antennas 21, 22 in FIG. 1, for example). Additionally, a ceiling inside the building 1101 is installed with a base-station radio device 1103b, including a transmitter and a receiver which have antennas capable of transmitting and receiving the polarized waves as described in any of the first to tenth embodiments, and a base-station integrated-antenna-for-two-orthogonally-polarized-waves 1102b in combination.

An outer floor surface of the elevator car 1111 is installed with a terminal-station integrated-antenna-for-two-orthogonally-polarized-waves 1112a including a transmitter and a receiver which have antennas capable of transmitting and receiving the polarized waves as described in any of the first to tenth embodiments. Additionally, an outer ceiling of the elevator car 1111 is installed with a terminal-station integrated-antenna-for-two-orthogonally-polarized-waves 1112b, including a transmitter and a receiver which have antennas capable of transmitting and receiving the polarized waves as described in any of the first to tenth embodiments. The terminal-station integrated-antenna-for-two-orthogonally-polarized-waves 1112a, 1112b are both connected to a terminal-station radio device 1113 via high-frequency cables 1114.

The base-station radio devices 1103a, 1103b and the terminal-station radio device 1113 implement wireless transmission through the inside of the building 1101, and therefore electromagnetic waves undergo multiple reflections by the inner wall of the building 1101 and the outer wall of the elevator car 1111 to have a multiple-wave interference environment. The elevator control system 1100 of the present (eleventh) embodiment uses the wireless system (wireless communication system) of any of the first to tenth embodiments to achieve high-quality wireless transmission that allows for detecting modification of a propagation path by an outsider in a multiple-wave interference environment to compensate for degradation of communication quality between the transmitting and receiving points due to this modification.

Advantageous Effects of Eleventh Embodiment

The eleventh embodiment uses a wireless connection means with the above-identified wireless communication system to control and monitor the elevator car 1111 of the elevator control system 1100 remotely in the building 1101 without using a wired connection means so that any wired connection means such as a cable is eliminated. Accordingly, the same transport capacity is achieved with a smaller building dimensions. Alternatively, the size of the elevator may be increased with the same building dimensions to improve the transportation capacity.

Twelfth Embodiment: Substation Monitoring System

Figure 14:
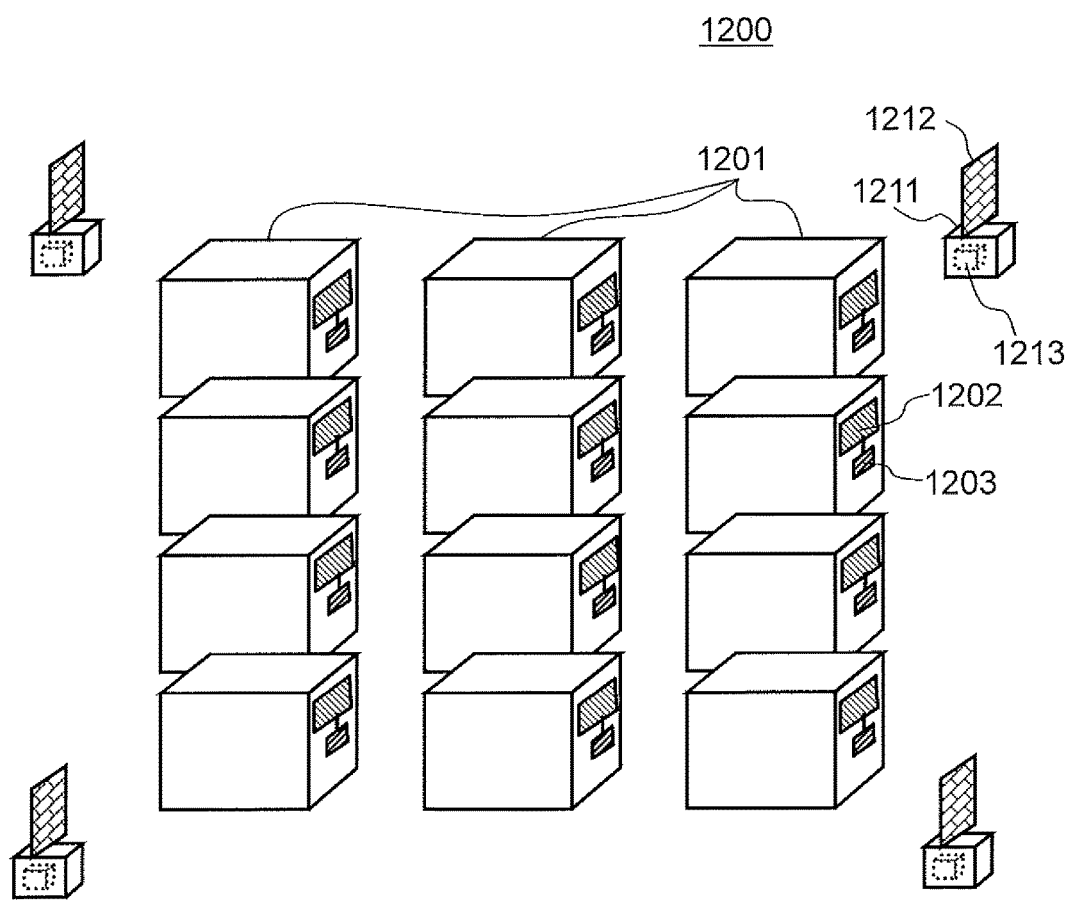
FIG. 14 is a diagram illustrating an exemplary configuration of a substation monitoring system according to a twelfth embodiment of the present invention.

As a twelfth embodiment of the present invention, a description will be given of an exemplary configuration of a substation monitoring system 1200 that adopts a wireless system of using a plurality of frequencies to control polarized waves, as described in the first to tenth embodiments of the present invention. FIG. 14 is a diagram showing an exemplary configuration of the substation monitoring system 1200 according to the twelfth embodiment of the present invention. In FIG. 14, the substation monitoring system 1200 of the present (twelfth) embodiment includes a plurality of transformers 1201, and a wireless system (wireless communication system) of any of the first to tenth embodiments or a wireless system having circularly polarized waves. A terminal-station radio device 1203 includes a transmitter and a receiver of a wireless system that use electromagnetic waves of circularly polarized waves. Besides, a terminal-station circularly polarized wave antenna 1202 composed of an integral-antenna-for-two-orthogonally-polarized-waves (circularly polarized wave antenna) is installed in combination with the terminal-station radio device 1203. In addition, base station apparatuses 1211 smaller in number than the transformers 1201 are set up in the vicinity of the transformers 1201.

A base-station radio device 1213 includes a transmitter and a receiver of a wireless system using electromagnetic waves of circularly polarized waves. Besides, a base-station circularly polarized wave antenna 1212 composed of an integrated-antenna-for-two-orthogonally-polarized-waves (circularly polarized wave antenna) is installed in combination with the base-station radio device 1213. A signal generated by the base-station radio device 1213 is transmitted from the base-station circularly polarized wave antenna 1212. Note that a circularly polarized wave antenna (integrated-antenna-for-two-orthogonally-polarized-waves) is an antenna that integrates two antennas, such as the first transmission antenna 21 and second transmission antenna 22 of the first embodiment, which are arranged to generate radio waves so as to be spatially orthogonal to each other.

As described above, the terminal-station radio device 1203 and the base station apparatus 1211 each have an antenna capable of transmitting and receiving circularly polarized waves, and include a transmitter and a receiver of a wireless system (radio communication system) using electromagnetic waves of circularly polarized waves to allow for wirelessly communicating by way of using electromagnetic waves of circularly polarized waves. Note that FIG. 14 shows the transformers 1201, the base station apparatuses 1211, the base-station circularly polarized wave antennas 1212, and the base-station radio devices 1213, but reference numerals are assigned to only representative ones and are omitted for other ones of the same kind.

The outer dimensions of the transformer 1201 are on the order of several meters and are overwhelmingly larger than the wavelengths of electromagnetic waves used by the radio device, which correspond to the frequency of hundreds of mega hertzes to several giga hertzes, to cause the electromagnetic waves to undergo multiple reflections by the transformers 1201, forming a multi-wave interference environment. The substation monitoring system 1200 of the present (twelfth) embodiment adopts a wireless system (wireless communication system) of any of the first to tenth embodiments described above to allow for achieving high-quality wireless transmission that uses a plurality of reflected waves under a multi-wave interference environment to compensate for degradation of communication quality between the transmitting and receiving points.

Advantageous Effects of Twelfth Embodiment

According to the twelfth embodiment, the substation monitoring system 1200 allows for achieving high-quality wireless transmission that uses a plurality of reflected waves under a multi-wave interference environment to compensate for degradation of communication quality between the transmitting and receiving points, as described above. In addition, a wireless connection means using the radio devices according to the twelfth embodiment is used to control and monitor the transformers 1201 remotely by the wireless base station apparatuses 1211 without using a wired connection means. This resolves the problem of high voltage induction power, which is generated if the wired connection means such as a cable is used, to allow for eliminating cable-laying costs, and therefore is effective to improve the safety of the controlling and monitoring system for the transformers 1201 and to reduce costs.

Other Embodiments

Note that the present invention is not limited to the above-described embodiments, and further includes various modifications. For example, the above-described embodiments have been described in detail for the purpose of clearly illustrating the present invention, and are not necessarily limited to those having all the components described. Additionally, a part of the configuration of an embodiment can be replaced with a part of the configuration of another embodiment, and also a part or all of the configuration of another embodiment can be added to the configuration of an embodiment. Other embodiments and modifications will be further described below.

<<Codes CC1, CC2 and Code for Third Radio Device>>

In the first embodiment, the transmitter 101 includes the first transmission code (CC1) generator 2 and the second transmission code (CC2) generator 18, while the receiver 201 includes the first reception code (CC1) generator 41 and the second reception code (CC2) generator 32 for conducting wireless communication by means of the code CC1 and code CC2 being orthogonal to each other. Mainly, the code CC1 identifies own device (transmitter 101), while the code CC2 is used to identify another device (receiver 201). However, even if the code CC1 and the code CC2 are not strictly orthogonal to each other, wireless communication may practically be conducted by means of utilizing the features of the present application, as far as the codes are approximately orthogonal to each other. In this way, if being orthogonal to each other is not so strictly taken, a code CC3 may be assigned to a third radio device so as to have the code CC1, the code CC2, and the code CC3 assigned, which are approximately orthogonal to each other. Especially, the accuracy of approximation increases with the longer code length.

Once the codes CC1, CC2 and CC3 are set up which are approximately orthogonal to each other, the transmitter 101 uses the codes CC1, CC2 to wirelessly communicate with the receiver 201, and in the case of wirelessly communicating with the third radio device, the code CC2 from the second transmission code generator 18 is changed to the code CC3 in the combination of the transmission code (CC1) generator 2 and second transmission code (CC2) generator 18 of the transmitter 101 for wireless communication with the third radio device. Further, assuming that N is in general a natural number of 2 or more, not only wireless communication between the three radio devices but also wireless communication between N radio devices may be conducted by means of assigning N sets of code which are approximately orthogonal to each other. If N (sets, devices) is larger, the codes may have the longer length accordingly.

<<Orthogonality Between First and Second Transmission or Reception Antennas>>

In the first embodiment, for example, it has been described that the transmission antenna (V) 21 and the transmission antenna (H) 22 are spatially orthogonal to each other. The transmission antenna (V) 21 and the transmission antenna (H) 22 are preferably orthogonal to each other, but may not necessarily be orthogonal to each other in a strict sense. Even though they are not exactly positioned at an angle of 90 degrees (orthogonal), there are orthogonal components of polarized waves as far as they are not parallel to each other, and these orthogonal components of the polarized waves have interactions and advantageous effects as described in the first embodiment, but at a reduced level. That is, the transmission antenna (V) 21 and the transmission antenna (H) 22 do not necessarily have to be orthogonal to each other in a strict sense as described previously, as long as the antennas are not parallel to each other. This relationship also holds true for the reception antenna (V) 51 and the reception antenna (H) 52. In addition, these relationships hold true for not only the first embodiment but also the second to sixth embodiments.

<<Sharing of Carrier Wave and Circularly Polarized Wave>>

In the first embodiment shown in FIG. 1, the transmitter 101 is illustrated to include the transmission carrier wave generator 13 and the transmission carrier wave generator 14. However, both of these generate a carrier wave ($\cos \omega_c t$) and thus may be unified so as to be shared. Rather, the frequencies and phases of the carrier waves ($\cos \omega_c t$) preferably coincide with each other, respectively, and thus it is better to share one transmission carrier wave generator unless there is any problem on wiring, output capacity, or the like. Also, both the reception carrier wave generator 37 and reception carrier wave generator 44 of the receiver 201 in FIG. 1 generate a carrier wave ($\cos \omega_c t$), and thus may be unified in the receiver 201 so as to be shared.

In the second embodiment shown in FIG. 3, the transmitter 102 is illustrated to include the transmission carrier wave generator 13 and the transmission carrier wave generator 14. However, both of these also generate a carrier wave ($\cos \omega_c t$) and thus may be unified so as to be shared. Additionally in the transmitter 102 in FIG. 3, both the circularly-polarized-wave frequency-based cosine generator 5 and the circularly-polarized-wave frequency-based cosine generator 55 generate a cosine wave of a circularly polarized wave ($\cos \omega_p t$), and thus may be unified so as to be shared. Likewise, in the transmitter 102 in FIG. 3, both the circularly-polarized-wave frequency-based sine generator 6 and the circularly-polarized-wave frequency-based sine generator 53 generate a sine wave ($\sin \omega_p t$) of a circularly polarized wave, and thus may be unified so as to be shared. The same holds true for other embodiments. In this way, by sharing the transmission carrier wave generators (13, 14), the circularly-polarized-wave frequency-based cosine generators (5, 55), and the circularly-polarized-wave frequency-based sine generators (6, 53) may respectively be unified so as to be shared to reduce costs and space.

<<Antennas for Three Orthogonally Polarized Waves>>

In the first embodiment, the description has been given that the transmission antenna (V) 21 and the transmission antenna (H) 22 are spatially orthogonal to each other. However, the transmission antennas being spatially orthogonal to each other is not limited to two directions of the vertical direction (V) and the horizontal direction (H). Transmission antennas may be arranged not only in the vertical direction (V) and the horizontal direction (H) but also in the normal direction (N) so as to be spatially orthogonal to one another in the three-dimensional space (X, Y, Z) so that the technique described in the first embodiment is expanded. This will further improve accuracy to have advantageous effects of maintaining and improving communication quality, although details are omitted.

<<Integrated Antenna for Three Orthogonally Polarized Waves>>

In the elevator control system of the eleventh embodiment and the substation monitoring system of the twelfth embodiment, the descriptions have been given of examples using the integrated antenna for two orthogonally polarized waves (inclusive of a circularly polarized wave antenna), but the present invention is not limited thereto. An integrated antenna for three orthogonally polarized waves may also be used that is composed of three antennas with which polarized waves outputted as radio waves are orthogonal to one another in three directions of X-axis, Y-axis, and Z-axis in the three-dimensional space. This case provides advantageous effects of achieving wireless communication with better quality.

<<Application to Solar Battery Power Generation System>>

In the twelfth embodiment shown in FIG. 14, the description has been given of the example of the substation monitoring system arranged with the transformers 1201, but the similar application is not limited thereto. For example, the above-described wireless system is also applicable to a system for monitoring power generation facilities in a solar battery power generation system arranged with solar cells (i.e., solar battery power generation). Using electric wiring is not necessarily a good idea for controlling or monitoring a power generation facility arranged with solar cells. Therefore, wireless communication is used for such controlling or monitoring. In this case, surroundings arranged with solar cells is under a multi-wave interference environment, and accordingly applying the above-described wireless system has advantageous effects.

The invention claimed is:

1. A wireless system comprising:
   a transmitter including:
   two antennas that are spatially orthogonal to each other; and
   a transmission circuit that transmits a first signal having an information signal spread with one code and then superimposed on a circularly polarized wave, in which a polarized wave rotates with time, along with a second signal having the same information signal as the information signal spread with two different codes and then superimposed on statically polarized waves which are orthogonal to each other, and
   a receiver including:
   at least one antenna; and
   a reception circuit that takes a difference between a sum of two operation results obtained by despreading with two different codes a second received signal transmitted through the statically polarized waves, and an operation result obtained by despreading with one code a first received signal transmitted through the circularly polarized wave,
   wherein the transmitter and the receiver communicate with each other to transmit and receive the information signal.

2. A wireless system comprising:
   a transmitter including:
   two antennas that are spatially orthogonal to each other; and a transmission circuit that transmits a first signal having an information signal spread with one code and then superimposed on a circularly polarized wave, in which a polarized wave rotates with time, along with a second signal having the same information signal as the information signal spread with two different codes and then superimposed on statically polarized waves which are orthogonal to each other, and
a receiver including:
two antennas that are spatially orthogonal to each other; and
a reception circuit that takes a difference between a sum of two operation results obtained by despreading with the two different codes a second signal received by the two antennas, and an operation result obtained by despreading with one of the two codes a first signal received by one of the two antennas,
wherein the transmitter and the receiver communicate with each other to transmit and receive the information signal.

3. A wireless system comprising:
a transmitter including:
two antennas that are spatially orthogonal to each other; and
a transmission circuit that transmits a first signal generated by making an information signal spread with a code and then superimposed on a circularly polarized wave, in which a polarized wave rotates with time, utilizing two carrier waves having different frequencies, along with a second signal having the same information signal as the information signal spread with codes and then superimposed on statically polarized waves having different frequencies, which are orthogonal to each other, and
a receiver including:
a reception circuit that takes a difference between a sum of two operation results obtained by demodulating with different frequencies a second signal received through statically polarized waves, and an operation result obtained by demodulating with different frequencies a first signal received through a circularly polarized wave,
wherein the transmitter and the receiver communicate with each other to transmit and receive the information signal.

4. A wireless system comprising:
a transmitter including:
two antennas that are spatially orthogonal to each other; and
a transmission circuit that transmits a first signal having an information signal spread with a code and then superimposed on a circularly polarized wave, in which a polarized wave rotates with time, along with a second signal having the same information signal as the information signal spread with a different code and then superimposed on two circularly polarized waves which are temporally orthogonal to each other, and
a receiver including:
a reception circuit that takes a difference between an operation result obtained by despreading a first signal received through a circularly polarized wave, and an operation result obtained by despreading a second signal received through two circularly polarized waves which are temporally orthogonal to each other,
wherein the transmitter and the receiver communicate with each other to transmit and receive the information signal.

5. A wireless system comprising:
a transmitter including:
two antennas that are spatially orthogonal to each other; and
a transmission circuit that transmits a first signal having an information signal spread with a first code and then superimposed on a circularly polarized wave, in which a polarized wave rotates with time, along with a second signal having the same information signal as the information signal spread with a second code and then superimposed on two circularly polarized waves which rotate in different directions from each other, and
a receiver including:
a reception circuit that takes a difference between an operation result obtained by despreading a first signal received through a circularly polarized wave, and an operation result obtained by despreading a second signal received through two circularly polarized waves which are temporally orthogonal to each other,
wherein the transmitter and the receiver communicate with each other to transmit and receive the information signal.

6. The wireless system according to claim 1, wherein a rotation frequency of a polarized wave in the circularly polarized wave is smaller than one-tenth of a propagation frequency.

7. The wireless system according to claim 2, wherein a rotation frequency of a polarized wave in the circularly polarized wave is smaller than one-tenth of a propagation frequency.

8. The wireless system according to claim 3, wherein a rotation frequency of a polarized wave in the circularly polarized wave is smaller than one-tenth of a propagation frequency.

9. The wireless system according to claim 4, wherein a rotation frequency of a polarized wave in the circularly polarized wave is smaller than one-tenth of a propagation frequency.

10. The wireless system according to claim 1, wherein the wireless system selects a predetermined time within a period of the circularly polarized wave to conduct communication.

11. The wireless system according to claim 2, wherein the wireless system selects a predetermined time within a period of the circularly polarized wave to conduct communication.

12. The wireless system according to claim 3, wherein the wireless system selects a predetermined time within a period of the circularly polarized wave to conduct communication.

13. The wireless system according to claim 4, wherein the wireless system selects a predetermined time within a period of the circularly polarized wave to conduct communication.

14. The wireless system according to claim 1, wherein the transmitter includes a plurality of the different codes for spreading a signal, and temporally switches the plurality of the codes.

15. The wireless system according to claim 2, wherein the transmitter includes a plurality of the different codes for spreading a signal, and temporally switches the plurality of the codes.

16. The wireless system according to claim 3, wherein the transmitter includes a plurality of the codes for spreading a signal, and temporally switches the plurality of the codes.

17. The wireless system according to claim 4, wherein
the transmitter includes a plurality of the first and second
codes for spreading a signal, and temporally switches
the plurality of the codes.

18. The wireless system according to claim 1, wherein one of the codes has a self-correlation property equal to or more than a predetermined value as well as a cross-correlation property equal to or less than an another predetermined value.

19. An elevator control system adopting the wireless system according to claim 1.

20. A substation monitoring system adopting the wireless system according to claim 1.

* * * * *